United States Patent
Hara et al.

(10) Patent No.: US 10,198,093 B2
(45) Date of Patent: Feb. 5, 2019

(54) STYLUS AND SENSOR CONTROLLER

(71) Applicant: Wacom Co., Ltd., Saitama (JP)

(72) Inventors: Hideyuki Hara, Tokyo (JP); Yoshio Nomura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/849,352

(22) Filed: Dec. 20, 2017

(65) Prior Publication Data

US 2018/0113523 A1  Apr. 26, 2018

Related U.S. Application Data

(63) Continuation of application No. PCT/JP2016/071993, filed on Jul. 27, 2016.

(51) Int. Cl.
| | |
|---|---|
| *G06F 3/033* | (2013.01) |
| *G06F 3/0354* | (2013.01) |
| *G06F 3/044* | (2006.01) |
| *G06F 3/041* | (2006.01) |
| *G06F 3/038* | (2013.01) |

(52) U.S. Cl.
CPC .......... *G06F 3/03545* (2013.01); *G06F 3/044* (2013.01); *G06F 3/0416* (2013.01); *G06F 3/0383* (2013.01); *G06F 2203/04112* (2013.01)

(58) Field of Classification Search
CPC .... G06F 3/03545; G06F 3/0383; G06F 3/044; G06F 3/041; G06F 3/0416; G06F 3/046
USPC ......................................................... 345/179
See application file for complete search history.

(56) References Cited

U.S. PATENT DOCUMENTS

| | | | | |
|---|---|---|---|---|
| 2010/0155153 A1* | 6/2010 | Zachut | ............... | G06F 3/03545 178/18.03 |
| 2014/0240298 A1* | 8/2014 | Stern | .................... | G06F 3/0383 345/179 |
| 2016/0209940 A1* | 7/2016 | Geller | ................... | G06F 3/0416 |

FOREIGN PATENT DOCUMENTS

| | | |
|---|---|---|
| JP | 2014-203211 A | 10/2014 |
| JP | 5913759 B1 | 4/2016 |
| JP | 2016-126503 A | 7/2016 |
| WO | 2015/111159 A | 7/2015 |
| WO | 2015/137053 A1 | 9/2015 |

OTHER PUBLICATIONS

Written Opinion of the International Searching Authority, dated Oct. 11, 2016, for International Application No. PCT/JP2016/071993, 6 pages.

* cited by examiner

*Primary Examiner* — Jimmy H Nguyen

(74) *Attorney, Agent, or Firm* — Seed IP Law Group LLP

(57) ABSTRACT

A stylus capable of bidirectionally communicating with a sensor controller includes a receiver that receives an uplink signal sent by the sensor controller, a controller that determines whether a signal having a predetermined waveform is to be continuously sent over a second time period or to be continuously sent over a first time period longer than the second time period, on the basis of the uplink signal, and a transmitter that continuously sends the signal having the predetermined waveform over the first time period or the second time period on the basis of the result of determination by the controller. As a result, the sensor controller can detect a burst signal from the stylus over a wide range in a sensor touch surface, to thereby reduce the possibility that the sensor controller may fail to detect the burst signal.

11 Claims, 14 Drawing Sheets

FIG.1
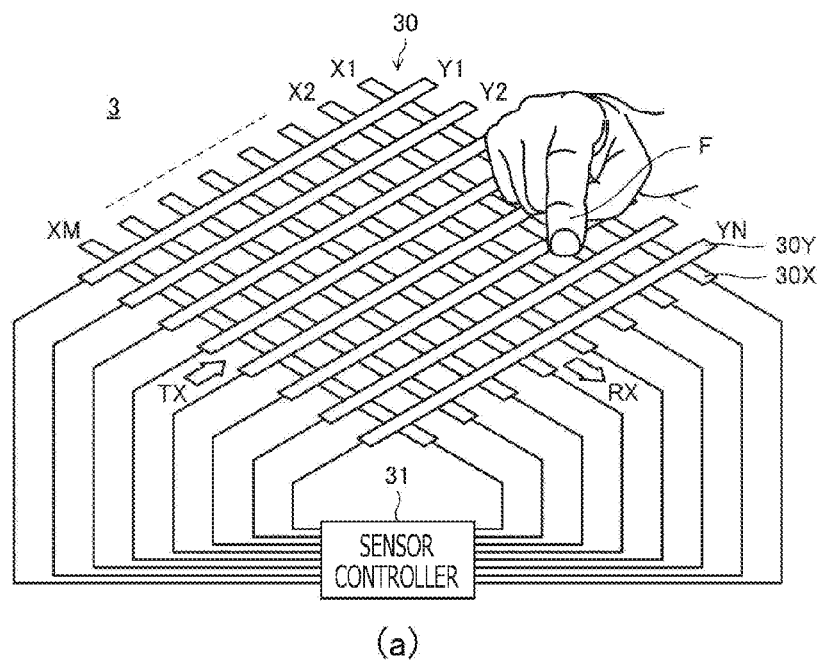
(a)
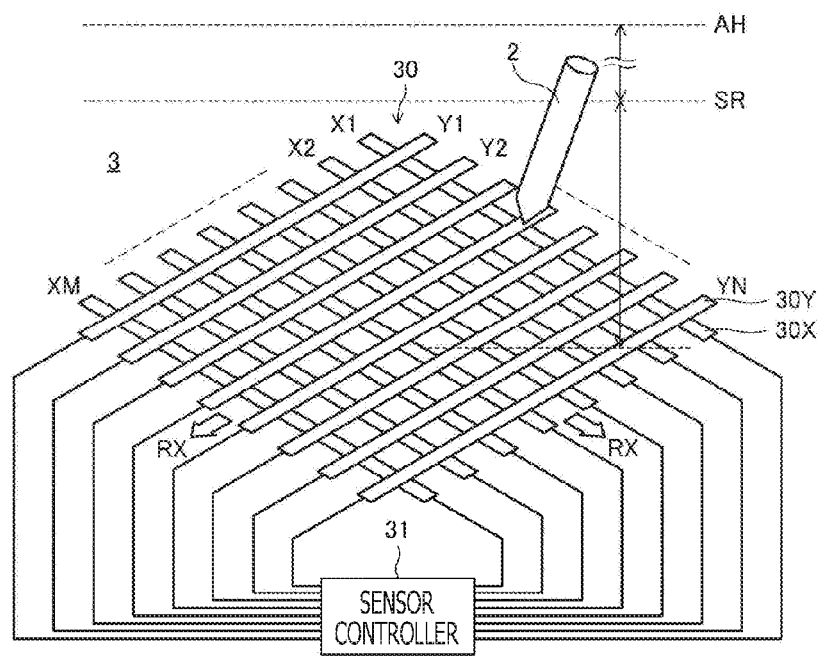
(b)

(a)

(b)

FIG.5
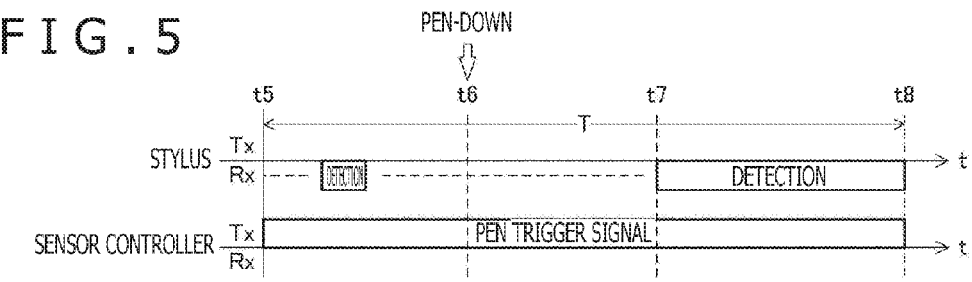
(a)
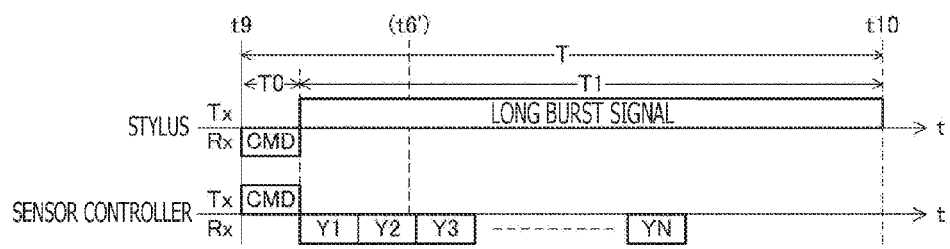
(b)
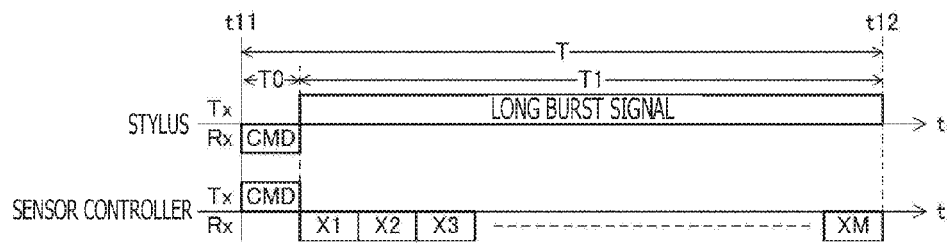
(c)
FIG.6
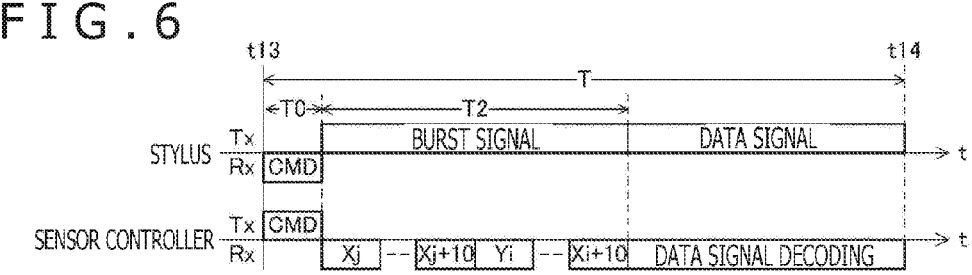

FIG.7
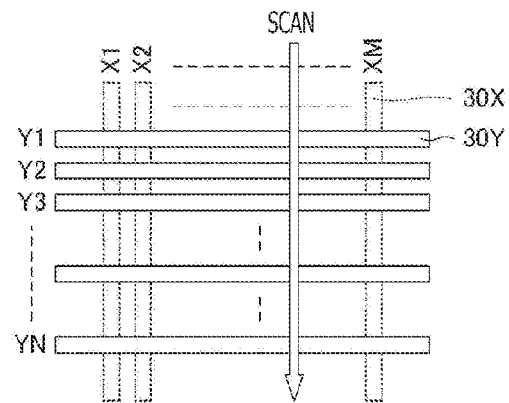
(a)
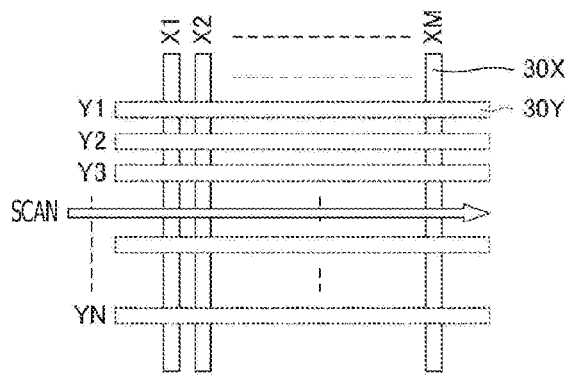
(b)
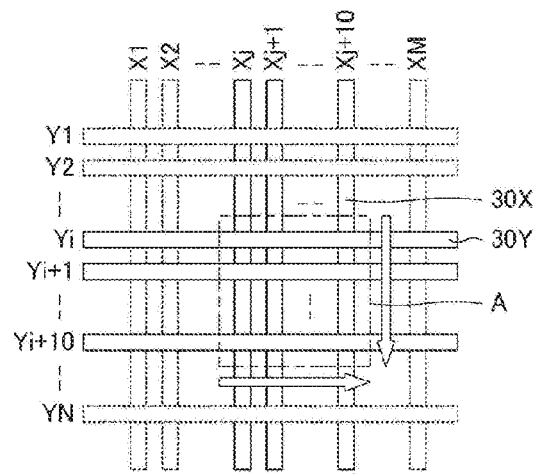
(c)

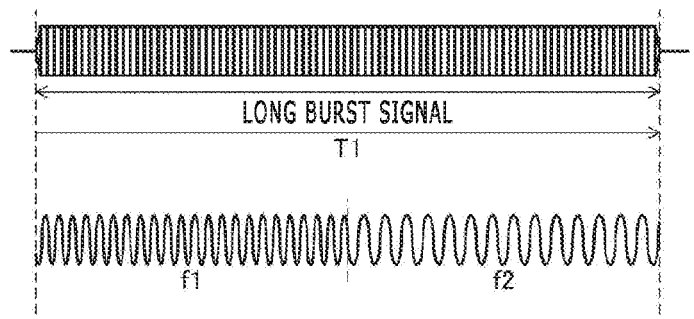
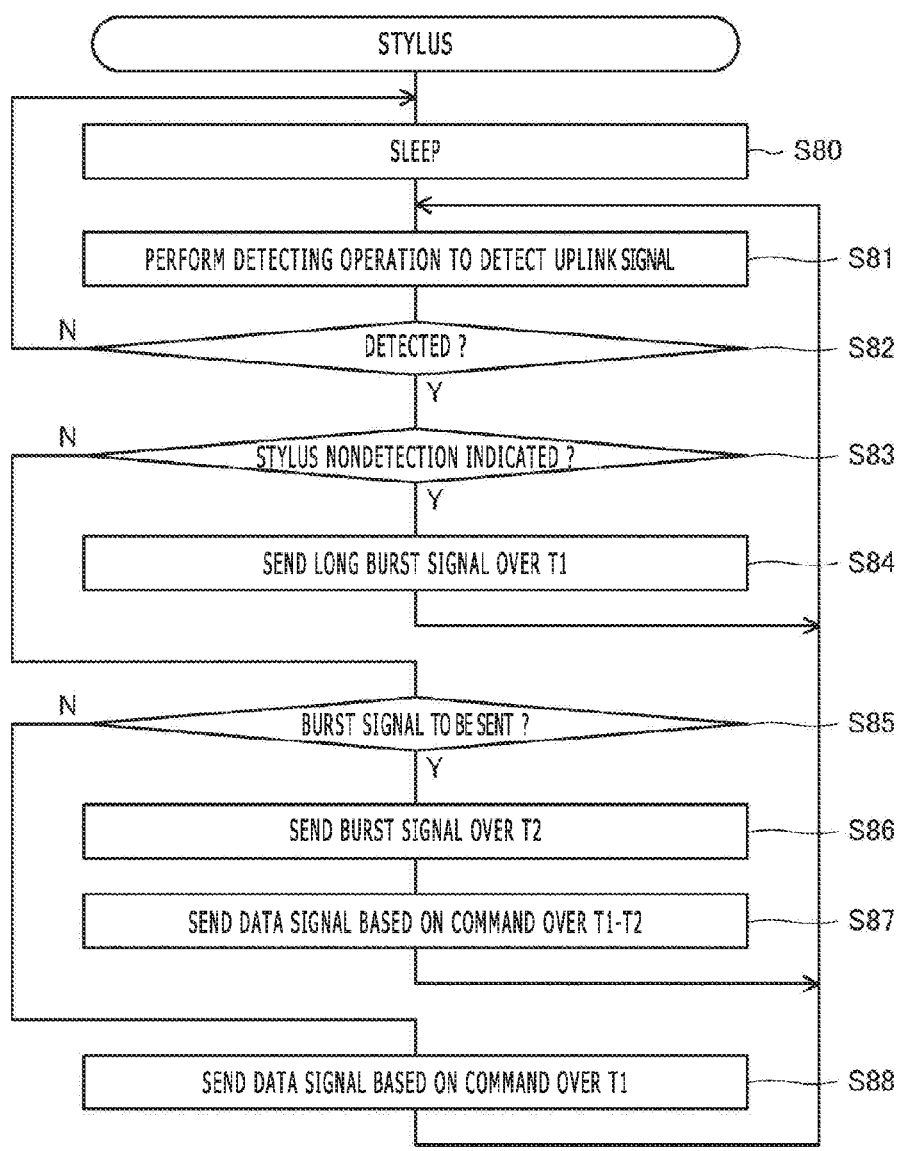

FIG.17
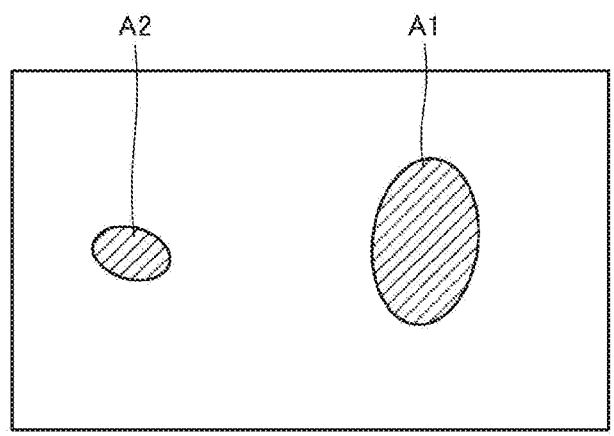
(a)
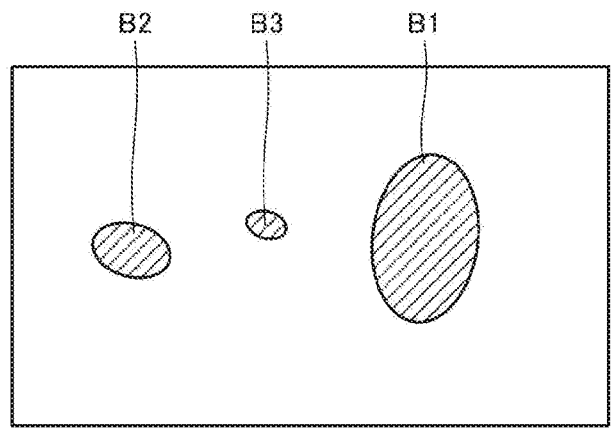
(b)

STYLUS AND SENSOR CONTROLLER

BACKGROUND

Technical Field

The present disclosure relates to a stylus and a sensor controller, and more particularly to a stylus and a sensor controller that form a position detecting system in which the sensor controller detects the stylus based on a burst signal sent from the stylus.

Description of the Related Art

Heretofore, a stylus sends, to a sensor controller, a burst signal for detecting the stylus and its position as well as a data signal including data indicative of a pen pressure and a stylus ID. The burst signal is a signal having a predetermined waveform (e.g., an unmodulated signal having a predetermined frequency) that is known in advance between the stylus and the sensor controller. The data signal is a signal modulated with data to be sent. FIG. 7 of Patent Document 1 discloses an example of a stylus that sends such signals.

When the sensor controller has not yet detected the stylus, the sensor controller performs a detecting operation by successively using all of a plurality of electrodes arrayed on a touch surface, trying to detect the burst signal. If the sensor controller detects the burst signal as a result, the sensor controller uses only some of the electrodes that are positioned in the vicinity of the electrode that has detected the burst signal, trying to detect the data signal.

PRIOR ART DOCUMENT

Patent Document

Patent Document 1: PCT Patent Publication No. WO2015/111159

BRIEF SUMMARY

Technical Problems

The conventional sensor controller faces a challenge in that when the stylus has not yet contacted the touch surface (in hover state), sometimes the sensor controller fails to detect the burst signal even though the burst signal has reached the touch surface. This is because the stylus in hover state is distanced from the touch surface, reducing the amplitude of the burst signal detected by the sensor controller to an extent that sufficient signal/noise (S/N) ratio cannot be achieved. One way of obtaining a sufficient S/N ratio even when the stylus is in hover state would be to increase the period of a detecting operation per electrode. However, the increased period of a detecting operation per electrode makes it difficult to detect the burst signal over a wide range in the touch surface. Then, before all the electrodes in the range can be scanned, the transmission of the burst signal may end.

Furthermore, even when a pen-down operation is performed in which the stylus and the sensor controller approach each other at a distance that provides a sufficient S/N ratio, if the stylus is sending the data signal rather than the burst signal at this timing, then there is a possibility that the sensor controller may fail to detect the stylus.

An aspect of the present disclosure is to provide a stylus and a sensor controller that maintain a state in which the sensor controller can detect a burst signal over a wide range in a touch surface in order to identify the position of the stylus that has not been detected, to thereby reduce the possibility that the sensor controller may fail to detect the burst signal.

Technical Solution

According to an aspect of the present disclosure, a stylus capable of bidirectionally communicating with a sensor controller includes a receiver that receives an uplink signal sent by the sensor controller, a controller that determines whether a signal having a predetermined waveform is to be continuously sent over a second time period or to be continuously sent over a first time period longer than the second time period, on the basis of the uplink signal, and a transmitter that continuously sends the signal having the predetermined waveform over the first time period or the second time period on the basis of the result of determination by the controller.

According to another aspect of the present disclosure, a stylus capable of bidirectionally communicating with a sensor controller includes a receiver that receives an uplink signal sent by the sensor controller, a controller that determines a state of the sensor controller based on the uplink signal, and a transmitter that continuously sends a signal having a predetermined pattern that is known in advance between the stylus and the sensor controller over a predetermined time period in response to a command from the controller if the uplink signal indicates that the sensor controller has not detected the stylus. The transmitter continuously sends a data signal that varies depending on an operation state of the stylus, rather than continuously sending the signal having the predetermined pattern over the predetermined time period, if the uplink signal indicates that the sensor controller has derived the position of the stylus.

According to an aspect of the present disclosure, a sensor controller capable of deriving the position of a stylus by detecting a signal sent from the stylus is arranged to carry out a step of determining whether the stylus has not been detected or has been detected, a step of, if it is determined that the stylus has been detected, sending a second uplink signal for instructing the stylus to continuously transmit a signal having a predetermined waveform over a second time period, and a step of, if it is determined that the stylus has not been detected, sending a first uplink signal for instructing the stylus to continuously transmit the signal having the predetermined waveform over a first time period longer than the second time period.

According to another aspect of the present disclosure, a sensor controller connected to an electrode matrix of M first electrodes extending in a first direction and N second electrodes extending in a second direction different from the first direction is arranged to carry out a finger touch detecting step of supplying a predetermined signal respectively to the M first electrodes and detecting a finger touch based on the predetermined signal detected respectively by the N second electrodes, a full-range scanning step of detecting an undetected stylus and deriving positional coordinates of the stylus using at least part of the M first electrodes and at least part of the N second electrodes, and a sector scanning step of deriving positional coordinates of a detected stylus using fewer first electrodes than the first electrodes used in the full-range scanning step and fewer second electrodes than the second electrodes used in the full-range scanning step.

Advantageous Effects

According to the present disclosure, in a stylus undetected state where the possibility that the stylus is hovering is high, the sensor controller can expect the stylus to send a long burst signal which continues for a longer period of time than a normal burst signal. Consequently, while the time period of the detecting operation per linear electrode is made longer than when a normal burst signal is received, it is possible to scan more electrodes within the time period of continuous transmission of a long burst signal, for the purpose of detecting a burst signal. The possibility that the sensor controller may fail to detect a burst signal can be reduced, while ensuring that the sensor controller is capable of detecting a burst signal over a wide range in a touch surface.

BRIEF DESCRIPTION OF THE DRAWINGS

FIG. 1 is a diagram depicting an arrangement of an electronic device 3 according to an embodiment of the present disclosure. FIG. 1(a) depicts a mode of operation of the electronic device 3 for detecting a touch by a finger F, and FIG. 1(b) depicts a mode of operation of the electronic device 3 for detecting a stylus 2.

FIG. 4(a) depicts the sequence in which the sensor controller 31 sends a pen trigger signal, and FIG. 4(b) depicts the sequence in which the sensor controller 31 requests that a long burst signal be sent.

FIG. 5 is a diagram depicting sequences of signals sent and received between the stylus 2 and the sensor controller 31 when the stylus 2 is within a sensing range SR and the sensor controller 31 has not yet identified the position of the stylus 2. FIG. 5(a) depicts the sequence in which the sensor controller 31 sends a pen trigger signal, FIG. 5(b) depicts the sequence in which the sensor controller 31 receives a long burst signal sent by the stylus 2, using linear electrodes 30Y, and FIG. 5(c) depicts the sequence in which the sensor controller 31 receives a long burst signal sent by the stylus 2, using linear electrodes 30X.

FIG. 6 is a diagram depicting a sequence of signals sent and received between the stylus 2 and the sensor controller 31 when the stylus 2 is within the sensing range SR and after the sensor controller 31 has identified the position of the stylus 2. FIG. 6 depicts the sequence in which the stylus 2 sends a burst signal and a data signal in hover state.

FIG. 7 is a diagram illustrative of the manner in which the sensor controller 31 according to the embodiment of the present disclosure operates. FIG. 7(a) depicts a first half of a full-range scanning process, FIG. 7(b) depicts a second (latter) half of the full-range scanning process, and FIG. 7(c) depicts a sector scanning process.

FIG. 15 is a diagram depicting a long burst signal sent by a stylus 2 according to a fourth modification of the embodiment of the present disclosure.

FIG. 16 is a flowchart of an operation sequence of a stylus 2 according to a fifth modification of the embodiment of the present disclosure.

FIG. 17 is a diagram illustrative of a specific position excluding process according to a sixth modification of the embodiment of the present disclosure. FIG. 17(a) depicts finger touch areas detected by a finger touch detecting process, and FIG. 17(b) depicts positions of a stylus 2 derived by a stylus detecting process carried out immediately after the finger touch detecting process in FIG. 17(a).

DETAILED DESCRIPTION

Figure 2:
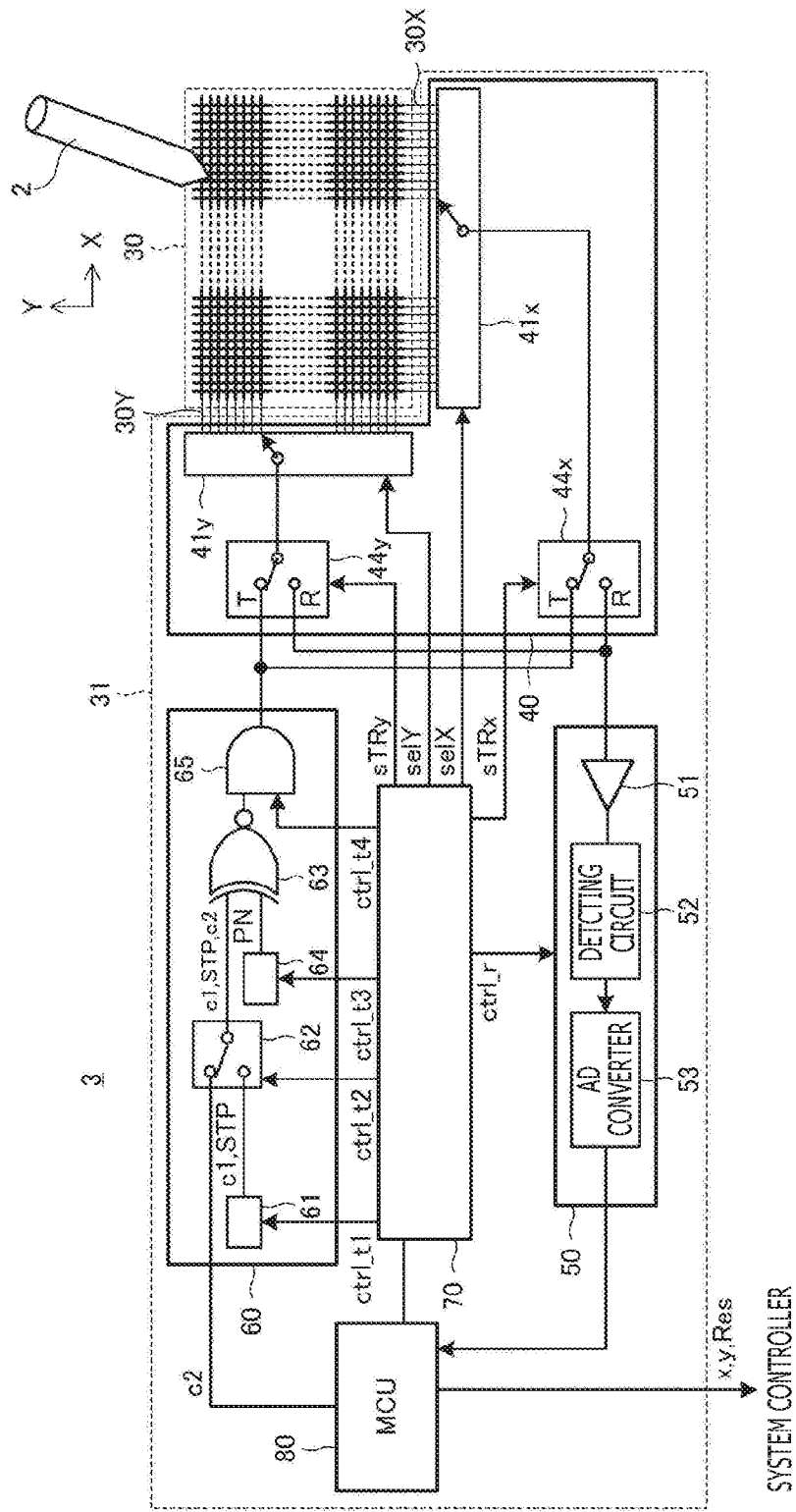
FIG. 2 is a diagram depicting an arrangement of the electronic device 3 according to the embodiment of the present disclosure.

An embodiment of the present disclosure will be described in detail below with reference to the accompanying drawings.

FIG. 1 is a diagram depicting an arrangement of an electronic device 3 according to the present embodiment. The electronic device 3 is a computer having a touch surface such as a tablet terminal, for example, and includes a sensor 30 and a sensor controller 31, as depicted in FIG. 1.

The sensor 30 includes a matrix of electrodes including M linear electrodes 30X (first electrodes) and N (N<M) linear electrodes 30Y (second electrodes) that are disposed inside the touch surface. According to a specific example, M=72, N=46. The M linear electrodes 30X extend at equal intervals in a first direction parallel to the touch surface. The N linear electrodes 30Y extend at equal intervals in a second direction parallel to the touch surface and perpendicular to the first direction. The linear electrodes 30X and the linear electrodes 30Y are respectively connected to the sensor controller 31.

The sensor controller 31 detects, via the sensor 30, a touch by a finger F (also deriving positional coordinates of finger F on the touch surface) and detects, via the sensor 30, the stylus 2 (also deriving positional coordinates of the stylus 2 on the touch surface), in a time-division manner.

FIG. 1(a) depicts a mode of operation of the electronic device 3 for detecting a touch by finger F. As depicted in FIG. 1(a), for detecting a touch by finger F, the sensor controller 31 supplies the linear electrodes 30Y successively with a predetermined signal (hereinafter referred to as "finger detecting signal") and successively scans potentials of the linear electrodes 30X to detect the finger detecting signal that has reached the linear electrodes 30X through the intersections of the linear electrodes 30X and 30Y. The amplitude of the finger detecting signal detected in this manner is smaller when finger F is close to the intersection, through which the finger detecting signal passes, than when finger F is not close to the intersection. This is because part of the electric current that flows through the linear electrodes 30X and 30Y flows toward the human body via a capacitive coupling between finger F and the linear electrodes 30X and 30Y. The sensor controller 31 detects a touch by finger F by detecting this change in the amplitude.

FIG. 1(b) depicts a basic mode of operation of the electronic device 3 for detecting the stylus 2. As depicted in FIG. 1(b), in the basic mode of operation for detecting the stylus 2, the sensor controller 31 performs a detecting operation on a signal (hereinafter referred to as "downlink signal") sent by the stylus 2, using the linear electrodes 30X and 30Y successively as reception electrodes. The sensor controller 31 detects the stylus 2 based on the detected downlink signal. In actual operation, there is a situation in which the sensor controller 31 detects the stylus 2 using only some of the linear electrodes 30X and 30Y. Such situation will be described later.

In order for the sensor controller 31 to detect the stylus 2, it is necessary for the stylus 2 to be sufficiently close to the touch surface of the electronic device 3 so that the sensor controller 31 can receive the downlink signal. A sensing range SR that is illustrated in FIG. 1(b) is a schematic representation of a range in which the sensor controller 31 can receive the downlink signal. When the stylus 2 enters the sensing range SR, the sensor controller 31 detects the downlink signal, thereby detecting the stylus 2. The movement of the stylus 2 from outside the sensing range SR into the sensing range SR will hereinafter be referred to as "pen-down." The pen-down is usually performed by an action of the user to bring the stylus 2 closer to the touch surface of the electronic device 3. The state in which the stylus 2 is not yet in contact with the touch surface though it has entered the sensing range SR is referred to as "hovering." When the stylus 2 has come into a hovering state based on pen-down, the sensor controller 31 tries to detect the stylus 2 by detecting a downlink signal. However, while the stylus 2 is hovering, there is a certain distance between the stylus 2 and the touch surface, and depending on the distance, it may be difficult to maintain a sufficient S/N ratio, sometimes resulting in a failure to detect the stylus 2. Even when the stylus 2 is in the sensing range SR, the sensor controller 31 may sometimes fail to detect the stylus 2 during a period in which the stylus 2 is sending a data signal rather than a burst signal. One of the aspects of the present disclosure is to avoid such failure.

Here, even when the stylus 2 is outside the sensing range SR, there are instances in which the stylus 2 is able to receive signals (hereinafter referred to as "uplink signals") that the sensor controller 31 has sent to the stylus 2. This is because some uplink signals (a pen trigger signal, a command signal for instructing the stylus 2 to send a long burst signal, etc. to be described later) are sent using the touch surface in its entirety (all of the linear electrodes 30X or all of the linear electrodes 30Y or both of them). An uplink detection height AH that is also illustrated represents a limitation on the height (distance from the touch surface) up to which the stylus 2 can receive those uplink signals. The uplink detection height AH is at a position higher (a position farther away) from the touch surface than the upper limit of the sensing range SR.

FIG. 2 is a diagram depicting an arrangement of the electronic device 3 according to the present embodiment. The linear electrodes 30X and the linear electrodes 30Y of the sensor 30 form capacitive coupling with the stylus 2 and with finger F. When finger F approaches the sensor 30, part of an electric current flowing from the sensor controller 31 to the linear electrodes 30Y is drawn into finger F through the capacitive coupling. Since the amplitude of the finger detecting signal detected by the linear electrodes 30X is now reduced, as described above, the sensor controller 31 is able to detect a touch by finger F. The sensor 30 is arranged to be able to send and receive signals bidirectionally to and from the stylus 2 through the capacitive coupling.

As depicted in FIG. 2, the sensor controller 31 includes a transmitter 60, a selector 40, a receiver 50, a logic unit 70, and a micro computing unit (MCU) 80.

The transmitter 60 is a circuit that generates a finger detecting signal at the timing to detect a touch by finger F, and generates uplink signals at the timing to detect the stylus 2. The uplink signals include a pen trigger signal that lets the stylus 2 know the existence of the sensor controller 31 and a command signal representing a command for the stylus 2.

FIG. 2 illustrates in detail the transmitter 60 as having functional blocks related to the generation of uplink signals. The functional blocks include a pattern supply 61, a switch 62, a spreading processor 63, a code train holder 64, and a transmission guard 65. In the present embodiment, the pattern supply 61 will be described as included in the transmitter 60. However, the pattern supply 61 may be included in the MCU 80.

The pen trigger signal includes a repetition of a predetermined detection pattern c1 and a predetermined delimiter pattern STP at the end.

The detection pattern c1 is a pattern of symbol values used for the stylus 2 to detect the existence of the sensor controller 31, and is known to the stylus 2 in advance (before the stylus 2 detects the sensor controller 31). A symbol is a unit of information used for modulation in a transmission process (a unit of information represented by a transmission signal), and a unit of information obtained by demodulating one symbol as a reception signal in a reception process. The symbol values may include a value that is converted into a bit train by the stylus 2 having received a symbol (hereinafter referred to as "bit train correlated value") and a value that is not converted into a bit train (hereinafter referred to as "bit train uncorrelated value"). According to a specific example, the detection pattern c1 includes a pattern "PM" made up of two (2) bit train uncorrelated values "P" and "M."

The delimiter pattern STP is a pattern of symbol values for notifying the stylus 2 of the end of the repetition period of the detection pattern c1, and includes a pattern that does not appear in the repetition of the detection pattern c1. The delimiter pattern STP is also known to the stylus 2 in advance (before the stylus 2 detects the sensor controller 31). According to an example, if the detection pattern c1 includes a pattern "PM" made up of two bit train uncorrelated values "P" and "M," as described above, then the delimiter pattern STP may include a pattern "PP" made up of two consecutive bit train uncorrelated values "P." The delimiter pattern STP and the detection pattern c1 may be switched around such that the delimiter pattern STP includes a pattern "PM" and the detection pattern c1 includes a pattern "PP."

The pattern supply 61 holds the detection pattern c1 and the delimiter pattern STP, and outputs these patterns in a predetermined order in accordance with the instruction of a control signal ctrl_t1 supplied from the logic unit 70. Specifically, the pattern supply 61 repeatedly outputs the detection pattern c1 in succession during a predetermined successive transmission period, and outputs the delimiter pattern STP immediately after the successive transmission period is finished. In this manner, the pen trigger signal is sent. The delimiter pattern STP may be output at the beginning of a command signal indicating an instruction to send a long burst signal (to be described later).

The switch 62 has a function to select either the pattern supply 61 or the MCU 80 based on a control signal ctrl_t2 supplied from the logic unit 70, and supply an output signal from the selected one to the spreading processor 63. If the switch 62 selects the pattern supply 61, then the spreading processor 63 is supplied with the detection pattern c1 or the delimiter pattern STP from the pattern supply 61. If the switch 62 selects the MCU 80, then the spreading processor 63 is supplied with control information c2 from the MCU 80.

The control information c2 includes information representing an instruction (command) for the stylus 2, and is generated by the MCU 80. The command signal described above includes the control information c2. The control information c2 is different from the detection pattern c1 and the delimiter pattern STP in that it includes symbol values (for example, 0 through 15) correlated to a variable-length bit train and these values are not shared with the stylus 2 in advance.

The code train holder 64 has a function to generate and hold a spread code PN of a predetermined chip length having autocorrelation characteristics on the basis of a control signal ctrl_t3 supplied from the logic unit 70. The spread code PN held by the code train holder 64 is supplied to the spreading processor 63.

The spreading processor 63 has a function to obtain a transmission chip train having a predetermined chip length by modulating the spread code PN held by the code train holder 64 on the basis of the symbol values (the detection pattern c1, the delimiter pattern STP, or the control information c2) supplied via the switch 62. The spreading processor 63 supplies the acquired transmission chip train to the transmission guard 65.

The transmission guard 65 has a function to insert a guard period (a period in which neither transmission nor reception is carried out) that is required to switch between a transmission operation and a reception operation, between a transmission period for uplink signals and a reception period for downlink signals, on the basis of a control signal ctrl_t4 supplied from the logic unit 70.

The receiver 50 is a circuit that receives a finger detecting signal sent by the transmitter 60 or downlink signals sent by the stylus 2 on the basis of a control signal ctrl_r from the logic unit 70. Specifically, the receiver 50 includes an amplifying circuit 51, a detecting circuit 52, and an analog-to-digital (AD) converter 53.

The amplifying circuit 51 amplifies and outputs a signal (a finger detecting signal or downlink signals) supplied from the selector 40. The detecting circuit 52 is a circuit that generates a voltage commensurate with the level of an output signal from the amplifying circuit 51. The AD converter 53 is a circuit that generates a digital signal by sampling the voltage output from the detecting circuit 52 at predetermined time intervals. The digital signal output by the AD converter 53 is supplied to the MCU 80.

The selector 40 includes switches 44x and 44y and conductor selecting circuits 41x and 41y.

The switches 44x and 44y include one-circuit two-contact switch elements, where a common terminal is selectively connected to either one of T terminal and R terminal. The common terminal of the switch 44x is connected to the conductor selecting circuit 41x, T terminal of the switch 44x is connected to the output terminal of the transmitter 60, and R terminal of the switch 44x is connected to the input terminal of the receiver 50. The common terminal of the switch 44y is connected to the conductor selecting circuit 41y, T terminal thereof is connected to the output terminal of the transmitter 60, and R terminal thereof is connected to the input terminal of the receiver 50.

The conductor selecting circuit 41x is a switch element for connecting the M linear electrodes 30X selectively to the common terminal of the switch 44x. The conductor selecting circuit 41x is arranged to be capable of connecting some or all of the M linear electrodes 30X simultaneously to the common terminal of the switch 44x.

The conductor selecting circuit 41y is a switch element for connecting the N linear electrodes 30Y selectively to the common terminal of the switch 44y. The conductor selecting circuit 41y is arranged to be able to connect some or all of the N linear electrodes 30Y simultaneously to the common terminal of the switch 44y.

The selector 40 is supplied with four control signals sTRx, sTRy, selX, and selY from the logic unit 70. Specifically, the control signal sTRx is supplied to the switch 44x, the control signal sTRy to the switch 44y, the control signal selX to the conductor selecting circuit 41x, and the control signal selY to the conductor selecting circuit 41y. The logic unit 70 controls the selector 40 using these control signals sTRx, sTRy, selX, and selY to send and receive a finger detecting signal, send uplink signals including a pen trigger signal and a command signal, and receive downlink signals. The controlling of the selector 40 by the logic unit 70 will be described in greater detail later.

The logic unit 70 and the MCU 80 serve as a controller that controls the transmitter 60, the receiver 50, and the selector 40 to thereby control transmission and reception operation of the sensor controller 31. Specifically, the MCU 80 includes a microprocessor that has a read-only memory (ROM) and a random-access memory (RAM) therein and operates according to predetermined programs. The logic unit 70 is arranged to output control signals described above under the control of the MCU 80. The MCU 80 is arranged to perform a process of deriving coordinate data x and y indicating the position of finger F or the stylus 2 on the basis of a digital signal supplied from the AD converter 53 and outputting the derived coordinate data x and y to a system controller of the electronic device 3, and, if the digital signal supplied from the AD converter 53 represents a data signal, a process of acquiring data Res represented by the digital signal and outputting the acquired data Res to the system controller of the electronic device 3.

The controlling of the selector 40 by the logic unit 70 will be described in specific detail below.

For sending and receiving a finger detecting signal, the logic unit 70 controls the selector 40 using the control signals sTRx, sTRy, selX, and selY so that N linear electrodes 30Y are successively connected to the output terminal of the transmitter 60 and the M linear electrodes 30X are successively connected to the input terminal of the receiver 50. As depicted in FIG. 1, it is possible to supply a finger detecting signal successively to the N linear electrodes 30Y and detect, with the receiver 50, the finger detecting signal that has come to the linear electrodes 30X through the intersections of the linear electrodes 30X and 30Y, thereby detecting a touch by finger F.

For sending uplink signals and receiving downlink signals, the logic unit 70 performs different processes depending on the manner in which the stylus 2 is detected and the types of downlink signals. The types of downlink signals and sequences of signals sent and received between the stylus 2 and the sensor controller 31 will first be described below, and then the manner in which the logic unit 70 operates to send uplink signals and receive downlink signals will be described in detail.

Figure 3:
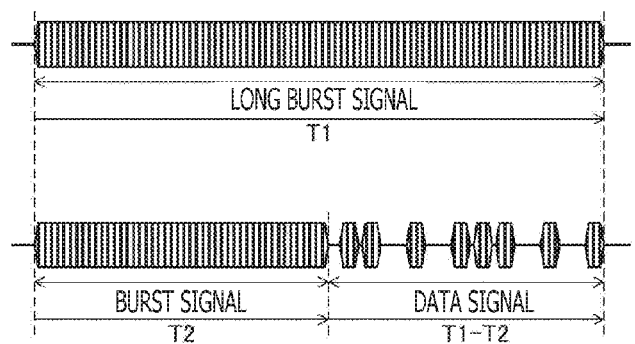
FIG. 3 is a diagram depicting configurations of a long burst signal, a burst signal, and a data signal that are sent by the stylus 2 according to the embodiment of the present disclosure.

FIG. 3 is a diagram depicting the types of downlink signals sent by the stylus 2 according to the embodiment of the present disclosure. As depicted in FIG. 3, the downlink signals include a long burst signal, a burst signal, and a data signal. The long burst signal includes a signal having a predetermined waveform as a predetermined pattern known in advance between the stylus 2 and the sensor controller 31, the signal being sent in succession over a predetermined time period T1 (first time period). The burst signal includes the above signal having the predetermined waveform, sent in succession over a predetermined time period T2 (second time period) shorter than the time period T1. The data signal includes a data signal generated by modulating the above signal having the predetermined waveform with data. Typically, the data signal is sent subsequently to the burst signal over a time period corresponding to the difference, T1−T2, between the time period T2 and the time period T1. It should be noted that a predetermined gap signal (not depicted) for delimiting the burst signal is inserted at the beginning of the burst signal. The types of the downlink signals to be sent by the stylus 2 are selected according to the instruction of command signals sent by the sensor controller 31.

Figure 4:
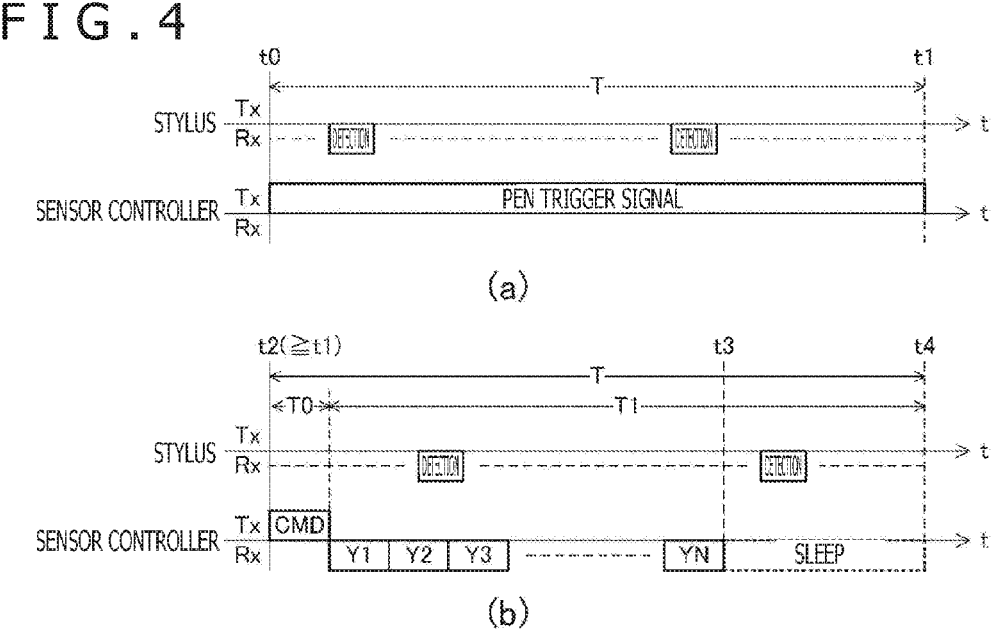
FIG. 4 is a diagram depicting sequences of signals sent and received between the stylus 2 and a sensor controller 31 when the stylus 2 is above an uplink detection height AH.

FIGS. 4 through 6 are diagrams depicting sequences of signals sent and received between the stylus 2 and the sensor controller 31. FIG. 4 depicts the sequences when the stylus 2 is above the uplink detection height AH, FIG. 5 depicts the sequences when the stylus 2 is within the sensing range SR and the sensor controller 31 has not yet identified the position of the stylus 2, and FIG. 6 depicts the sequence when the stylus 2 is within the sensing range SR and the sensor controller 31 has identified the position of the stylus 2. These sequences will be respectively described below.

<When the Stylus 2 is above the Uplink Detection Height AH>

FIG. 4(a) depicts the sequence in which the sensor controller 31 sends a pen trigger signal and FIG. 4(b) depicts the sequence in which the sensor controller 31 requests that a long burst signal be sent.

As depicted in FIG. 4(a), the sensor controller 31 sends a pen trigger signal over a time period T (=t1−t0) from time t0 to time t1. The sensor controller 31 sends the pen trigger signal when it has not yet detected the stylus 2. As described above, the pen trigger signal includes a repetition of a predetermined detection pattern c1 and a predetermined delimiter pattern STP at the end. The stylus 2 intermittently performs a detecting operation to detect the detection pattern c1 by intermittently performing a detecting operation to detect the symbols ("P" and "M" in the above example) of the detection pattern c1. If the stylus 2 is above the uplink detection height AH, then it cannot detect the detection pattern c1 with its detecting operation. Therefore, the stylus 2 simply repeats the detecting operation to detect the detection pattern c1.

As depicted in FIG. 4(b), subsequently to the transmission of the pen trigger signal, the sensor controller 31 starts sending a command signal (denoted by "CMD" in FIGS. 4 through 6) at time t2 subsequent to time t1. The time period required to send the command signal is T0, which is shorter than the time period T. When the sensor controller 31 has not yet detected the stylus 2, the sensor controller 31 sends the command signal that instructs the stylus 2 to send a long burst signal. However, the stylus 2 which is above the uplink detection height AH is unable to receive the command signal and does not send a long burst signal in response to the command signal, but simply repeats the detecting operation to detect the detection pattern c1.

After the sensor controller 31 has sent the command signal that instructs the stylus 2 to send a long burst signal, the sensor controller 31 performs a detecting operation to detect a long burst signal. This detecting operation corresponds to a first half of a full-range scanning process to be described later, and is carried out using the N linear electrodes 30Y in succession. Details of the full-range scanning process will be described later. Since the stylus 2 does not send a long burst signal at this time, the sensor controller 31 does not detect a long burst signal. The time period that can be used for the detecting operation to detect a long burst signal is T1 (T−T0) corresponding to the difference between the time period T and the time period T0. When the detecting operation to detect a long burst signal is performed using the N linear electrodes 30Y in succession, the detecting operation of the long burst signal is temporarily completed at time t3 prior to time t4 (=t2+T) at which the time period T1 elapses. The sensor controller 31 that has not detected a long burst signal during the detecting operation enters a sleep mode from time t3 to time t4. The sensor controller 31 thus has its electric power consumption reduced. After time t4, the transmission of a pen trigger signal is repeated.

<When the Stylus 2 is within the Sensing Range SR and the Sensor Controller 31 has not yet Identified the Position of the Stylus>

FIG. 5(a) depicts the sequence in which the sensor controller 31 sends a pen trigger signal, FIG. 5(b) depicts the sequence in which the sensor controller 31 receives a long burst signal sent by the stylus 2, using linear electrodes 30Y, and FIG. 5(c) depicts the sequence in which the sensor controller 31 receives a long burst signal sent by the stylus 2, using linear electrodes 30X.

As depicted in FIG. 5(a), when a pen-down movement is made (time t6), the stylus 2 can detect the detection pattern c1 in its subsequent detecting operation (time t7) to detect the detection pattern c1. Having detected the detection pattern c1, the stylus 2 continues the detecting operation until a delimiter pattern STP is detected. When the delimiter pattern STP is detected, the stylus 2 synchronizes with the sensor controller 31 on the basis of the detection time. The synchronization is carried out by the generation of a transmission and reception schedule to be specifically described later.

FIG. 5(a) depicts an example in which a pen-down movement is made at time t6 between time t5 at which a pen trigger signal starts being sent and time t8 (=t5+T) at which the pen trigger signal ends being sent, and the stylus 2 detects the detection pattern c1 at time t7 prior to time t8. The same process is carried out even if a pen-down movement is made (e.g., at time t6' depicted in FIG. 5(b)) while the sensor controller 31 is performing a detecting operation to detect a long burst signal, except that the timing for the stylus 2 to detect the detection pattern c1 is slightly delayed.

Then, as depicted in FIG. 5(b), when the sensor controller 31 starts sending a command signal for instructing the stylus 2 to send a long burst signal at time t9 after time t8, the stylus 2 receives the command signal and continuously sends a long burst signal over a time period T1 until time t10 (=t9+T). The sensor controller 31 detects the stylus 2 by detecting the long burst signal thus sent.

Specifically, as depicted in FIG. 5(b), the sensor controller 31 uses the N linear electrodes 30Y in succession to perform a detecting operation to detect a long burst signal (a first half of a full-range scanning process to be described later). At this time, since a long burst signal is detected with either one or more of the linear electrodes 30Y, the sensor controller 31 stores the detected intensity of the long burst signal at each of the linear electrodes 30Y. Then, as depicted in FIG. 5(c), the sensor controller 31 again starts to send a command signal for instructing the stylus 2 to send a long burst signal at time t11 after time t10, and again performs a detecting operation to detect a long burst signal from the end of the transmission of the command signal. This detecting operation is carried out using the M linear electrodes 30X in succession until time t12 (=t11+T) (a latter half of a full-range scanning process to be described later). Since a long burst signal is detected with either one or more of the linear electrodes 30X in this detecting operation, the sensor controller 31 stores the detected intensity of the long burst signal at each of the linear electrodes 30X. The sensor controller 31 then derives the positional coordinates of the stylus 2 on the touch surface on the basis of the previously stored detected intensity of the long burst signal at each of the linear electrodes 30Y and the presently stored detected intensity of the long burst signal at each of the linear electrodes 30X.

<When the Stylus 2 is within the Sensing Range SR and after the Sensor Controller 31 has Identified the Position of the Stylus 2>

FIG. 6 depicts the sequence in which the stylus 2 sends a burst signal and a data signal. As depicted in FIG. 6, the sensor controller 31 that has identified the position of the stylus 2 starts sending a command signal for instructing the stylus 2 to send data at subsequent time t13. In response to the command signal, the stylus 2 continuously sends a burst signal over time period T2. The sensor controller 31 detects the burst signal, and derives positional coordinates of the stylus 2 on the basis of the detected burst signal. The detecting operation to detect the burst signal is carried out successively using only those of the M linear electrodes 30X and the N linear electrodes 30Y which are indicated as being in the vicinity of the stylus 2 by the positional coordinates of the stylus 2 that have been derived at the last time (sector scanning process to be described later). The stylus 2 sends a data signal including data that it has been instructed to send, subsequently to the burst signal. The sensor controller 31 receives the data signal and decodes the data signal to acquire the data sent by the stylus 2. The reception of the data signal is carried out using only one linear electrode 30X or linear electrode 30Y that corresponds to the positional coordinates of the stylus 2 that have been derived at the last time.

Referring back to FIG. 2, operation of the logic unit 70 at the time of detecting the stylus 2 and performing bidirectional communication with the stylus 2 will be described in detail below with reference to FIG. 2.

For sending a pen trigger signal and a command signal for instructing the stylus 2 to send a long burst signal (FIGS. 4(a) and 4(b) and FIGS. 5(a), 5(b) and 5(c)), the logic unit 70 controls the selector 40 to use all of the M linear electrodes 30X or all of the N linear electrodes 30Y or both of them simultaneously. Specifically, the logic unit 70 controls the selector 40 with the control signals sTRx, sTRy, selX, and selY so that the output terminal of the transmitter 60 is connected to the M linear electrodes 30X or the N linear electrodes 30Y or both. Therefore, a pen trigger signal and a command signal for instructing the stylus 2 to send a long burst signal are sent using the touch surface in its entirety, thereby allowing the stylus 2 to receive these signals no matter where it may be located in the sensing range SR depicted in FIG. 1.

For receiving a long burst signal when the stylus 2 has not yet been detected (FIG. 4(b) and FIG. 5(b)), the logic unit 70 controls the selector 40 to use the N linear electrodes 30Y in succession, as depicted in FIG. 4(b) and FIG. 5(b). Specifically, the logic unit 70 controls the selector 40 using the control signals sTRy and selY to connect the N linear electrodes 30Y successively to the input terminal of the receiver 50. The sensor controller 31 can thus receive a long burst signal sent by the stylus 2, thereby detecting the stylus 2 no matter where it may be located in the sensing range SR depicted in FIG. 1.

FIG. 7(a) is a diagram illustrative of the manner in which the sensor controller 31 operates in such a case. As depicted in FIG. 7(a), the sensor controller 31 successively scans the N linear electrodes 30Y. The sensor controller 31 does not scan the M linear electrodes 30X at this time because it is possible to scan the entire surface of the sensor 30 using only the N linear electrodes 30Y and, in addition, in order to increase the scanning time period per electrode.

For receiving a long burst signal when positional coordinates of the stylus 2 have not yet been derived after having detected the stylus 2 by receiving a long burst signal (FIG. 5(c)), the logic unit 70 controls the selector 40 to use the M linear electrodes 30X in succession, as depicted in FIG. 5(c). Specifically, the logic unit 70 controls the selector 40 using the control signals sTRx and selX to connect the M linear electrodes 30X successively to the input terminal of the receiver 50. The sensor controller 31 derives positional coordinates of the stylus 2 on the touch surface in the manner described above on the basis of the results of the control of the selector 40 and the previous detection of the long burst signal with the N linear electrodes 30Y.

FIG. 7(b) is a diagram illustrative of the manner in which the sensor controller 31 operates in such a case. As depicted in FIG. 7(b), the sensor controller 31 successively scans the M linear electrodes 30X. In the present description, the scanning process that successively uses the N linear electrodes 30Y as depicted in FIG. 7(a) (first half) and the scanning process that successively uses the M linear electrodes 30X as depicted in FIG. 7(b) (latter half) are combined together into a process referred to as "full-range scanning process."

For sending a command signal after having derived positional coordinates of the stylus 2 (FIG. 6), the logic unit 70 controls the selector 40 to use only those of the M linear electrodes 30X and the N linear electrodes 30Y which are in the vicinity of the stylus 2. Specifically, if the stylus 2 is positioned at the intersection of the (j+5)th linear electrode 30X and the (i+5)th linear electrode 30Y, for example, then the logic unit 70 controls the selector 40 using the control signals sTRx, sTRy, selX, and selY so that five linear electrodes, for example, on each of both sides of the intersection, i.e., the jth to (j+10)th linear electrodes 30X and the ith to (i+10)th linear electrodes 30Y, are simultaneously connected to the output terminal of the transmitter 60. Since the sensor controller 31 can now send a command signal using only those linear electrodes in the vicinity of the stylus 2, the electric power consumption required to send a command signal is reduced. If the palm of a hand or the like placed on the touch surface is supplied with a command signal, then the ground potential supplied to the stylus 2 may increase, possibly resulting in a reduction in the accuracy with which the stylus 2 detects an uplink signal. However, inasmuch the sensor controller 31 sends a command signal using only those linear electrodes in the vicinity of the stylus 2, as described above, the possibility that the palm of a hand or the like will be supplied with a command signal is low, and hence the accuracy with which the stylus 2 detects an uplink signal is prevented from being reduced.

For receiving a normal burst signal rather than a long burst signal after having derived positional coordinates of the stylus 2 (FIG. 6), the logic unit 70 controls the selector 40 to use only those of the M linear electrodes 30X and the N linear electrodes 30Y which are in the vicinity of the stylus 2. Specifically, if the stylus 2 is positioned at the intersection of the (j+5)th linear electrode 30X and the (i+5)th linear electrode 30Y, for example, then the logic unit 70 controls the selector 40 using the control signals sTRx, sTRy, selX, and selY so that five linear electrodes, for example, as depicted in FIG. 6, on each of both sides of the intersection, i.e., the jth to (j+10)th linear electrodes 30X and the ith to (i+10)th linear electrodes 30Y, are successively connected to the input terminal of the receiver 50. Since the reception time period per linear electrode is thus increased, it is possible to receive a burst signal reliably.

FIG. 7(c) is a diagram illustrative of the manner in which the sensor controller 31 operates in such a case. In this example, it is assumed that the stylus 2 is positioned at the intersection of the (j+5)th linear electrode 30X and the (i+5)th linear electrode 30Y. The sensor controller 31 successively scans only 11 linear electrodes 30X ranging from the jth to (j+10)th linear electrodes 30X and 11 linear electrodes 30Y ranging from the ith to (i+10)th linear electrodes 30Y, among the M×N linear electrodes, and derives positional coordinates of the stylus 2 on the basis of the results of the scanning process. The scanning process in which both of some of the M linear electrodes X and some of the N linear electrodes Y are used to re-derive (update) positional coordinates of the stylus 2 that have been derived once is referred to as "sector scanning process."

For receiving a data signal (FIG. 6), the logic unit 70 controls the selector 40 to use only one linear electrode 30X or linear electrode 30Y corresponding to the position of the stylus 2 derived from the last burst signal. Specifically, the logic unit 70 controls the selector 40 using the control signals sTRx, sTRy, selX, and selY so that one linear electrode 30X or linear electrode 30Y is connected to the input terminal of the receiver 50. It is possible to utilize the data signal transmission time period (=T1−T2) to the fullest in order to send data from the stylus 2 to the sensor controller 31.

The operation of the logic unit 70 for detecting the stylus 2 and performing bidirectional communication with the stylus 2 has been described above.

Figure 8:
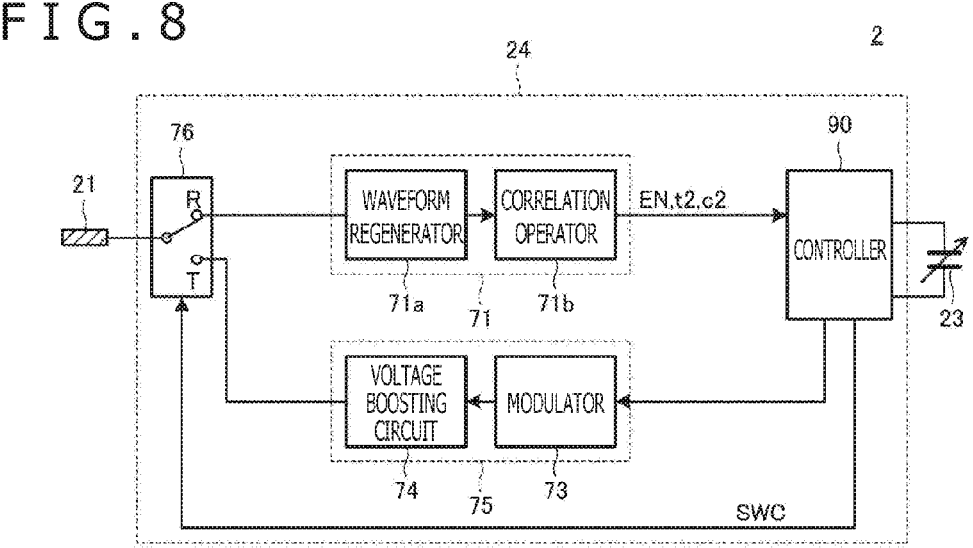
FIG. 8 is a diagram depicting an arrangement of the stylus 2 according to the embodiment of the present disclosure.

FIG. 8 is a block diagram depicting functional blocks of the stylus 2 according to the present embodiment. As depicted in FIG. 8, the stylus 2 includes an electrode 21, a pen pressure detection sensor 23, and a signal processor 24.

The electrode 21 is a conductive member provided adjacent to the distal end of a core body of the stylus 2. The electrode 21 serves as an antenna for sending downlink signals and also as an antenna for receiving uplink signals sent from the sensor controller 31 via the capacitive coupling.

The pen pressure detection sensor 23 is a pressure sensor that detects a pressure (pen pressure) applied to the distal end of the core body of the stylus 2.

The signal processor 24 has a function to receive uplink signals from the sensor controller 31 via the electrode 21, perform processing sequences depending on the contents of the received uplink signals, generate downlink signals to be sent to the sensor controller 31, and send the generated downlink signals to the sensor controller 31 via the electrode 21. Specifically, the signal processor 24 functionally includes a switch 76, a receiver 71, a transmitter 75, and a controller 90. These functional blocks will be described below in order.

The switch 76 includes a one-circuit two-contact switch element where a common terminal is selectively connected to either one of T terminal and R terminal. The common terminal of the switch 76 is connected to the electrode 21, T terminal thereof is connected to the output terminal of the transmitter 75, and R terminal thereof is connected to the input terminal of the receiver 71. The state of the switch 76 is controlled by control signals SWC from the controller 90. For receiving uplink signals from the sensor controller 31, the controller 90 controls the switch 76 with the control signal SWC so that R terminal and the common terminal are connected to each other. For sending downlink signals to the sensor controller 31, the controller 90 controls the switch 76 with the control signal SWC so that T terminal and the common terminal are connected to each other. In an initial state, i.e., during a period until the stylus 2 detects the detection pattern c1 described above, the controller 90 controls the switch 76 to keep R terminal and the common terminal connected to each other, and then enters a sleep mode for reducing the electric power consumed by the stylus 2.

The receiver 71 is a circuit that receives a signal supplied from the switch 76 (a signal that has arrived at the electrode 21) and decodes the symbol values contained in the received signal, and includes a waveform regenerator 71a and a correlation operator 71b. The receiver 71 is arranged to be able to detect a detection pattern c1, a delimiter pattern STP, and control information c2 described above by decoding the symbol values. Until the receiver 71 detects a detection pattern c1, it performs its reception operation only intermittently in order to reduce the electric power consumed by the stylus 2.

The waveform regenerator 71a binarizes the level of an electric charge (voltage) induced in the electrode 21 with a clock that is several times (e.g., four times) the chip rate of the spread code PN described above, shapes the binarized level into a binary train (chip train) having positive and negative polarity values, and outputs the chip train. The correlation operator 71b stores the chip train output from the waveform regenerator 71a into a register, performs a correlation operation on the chip train while successively shifting it with the above clock with respect to the spread code PN (or a code produced by inverting and/or cyclically shifting the spread code PN), thereby decoding the symbol values contained in the received signal.

The receiver 71 sequentially determines whether the symbol values decoded by the correlation operator 71b represent the detection pattern c1 or not. If the receiver 71 detects the detection pattern c1 as a result, then the receiver 71 detects the existence of the sensor controller 31 and issues a trigger signal EN to the controller 90, which makes it possible for the controller 90 to perform a process depending on the command indicated by the command signal.

When the receiver 71 has detected the detection pattern c1, it switches from the intermittent reception operation to a continuous reception operation, and sequentially determines whether the decoded symbol values represent the delimiter pattern STP or not. If the receiver 71 detects the delimiter pattern STP as a result, then the receiver 71 outputs detection time t2 to the controller 90.

After having detected the delimiter pattern STP, the receiver 71 performs a reception operation to receive a command signal sent by the sensor controller 31 according to a schedule (to be described later) from the controller 90. Specifically, the receiver 71 acquires the values of a string of symbols decoded by the correlation operator 71b during the reception operation, as control information c2, and outputs the acquired control information c2 to the controller 90.

The controller 90, which includes a microprocessor (MCU), is activated upon the supply of a trigger signal EN from the receiver 71, and generates a transmission and reception schedule for various signals on the basis of detection time t2 supplied from the receiver 71. Then, the controller 90 performs a process of generating control signals SWC based on the generated transmission and reception schedule and supplying the generated control signals SWC to the switch 76, a process of controlling the receiver 71 to receive command signals, and a process of controlling the transmitter 75 on the basis of control information c2 supplied from the receiver 71. The process of controlling the transmitter 75 includes determining whether a long burst signal is to be sent or a burst signal and a data signal are to be sent on the basis of a received command signal, instructing the transmitter 75 to send a long burst signal or a burst signal if a long burst signal or a burst signal is to be sent, and acquiring data which it is instructed to send by control information c2 and supplying the acquired data to the transmitter 75 if a data signal is to be sent. The data supplied to the transmitter 75 include data representing a pen pressure detected by the pen pressure detection sensor 23.

The transmitter 75 is a circuit that generates signals to be sent to the sensor controller 31 and supplies the generated signals to the electrode 21, and includes a modulator 73 and a voltage boosting circuit 74.

The modulator 73 is a circuit that generates a carrier signal (rectangular-wave signal) having a predetermined frequency or a frequency controlled by the controller 90, and outputs the carrier signal as it is or after modulating it under the control of the controller 90. When a long burst signal or a burst signal is to be sent, the modulator 73 does not modulate the carrier signal and outputs the carrier signal as it is, or modulates the carrier signal with a pattern of known values shared with the sensor controller 31 and outputs the modulated carrier signal. In this manner, the modulator 73 outputs a long burst signal prior to being boosted or a burst signal prior to being boosted. When a data signal is to be sent, the modulator 73 modulates the carrier signal with data supplied from the controller 90 (based on on/off keying (OOK), phase shift keying (PSK), or the like), and outputs the modulated signal obtained as a result. In this manner, the modulator 73 outputs a data signal prior to being boosted.

The voltage boosting circuit 74 boosts the voltage of output signals from the modulator 73 to a certain amplitude, to thereby generate a long burst signal, a burst signal, and a data signal. The long burst signal, the burst signal, and the data signal that have been generated by the voltage boosting circuit 74 are supplied via the switch 76 to the electrode 21, from which they are transmitted into space.

The arrangements and the operation of the stylus 2 and the sensor controller 31 according to the present embodiment have been described above. Now, operation of the stylus 2 and the sensor controller 31 will be described in detail below with reference to flowcharts of processing sequences.

Figure 9:
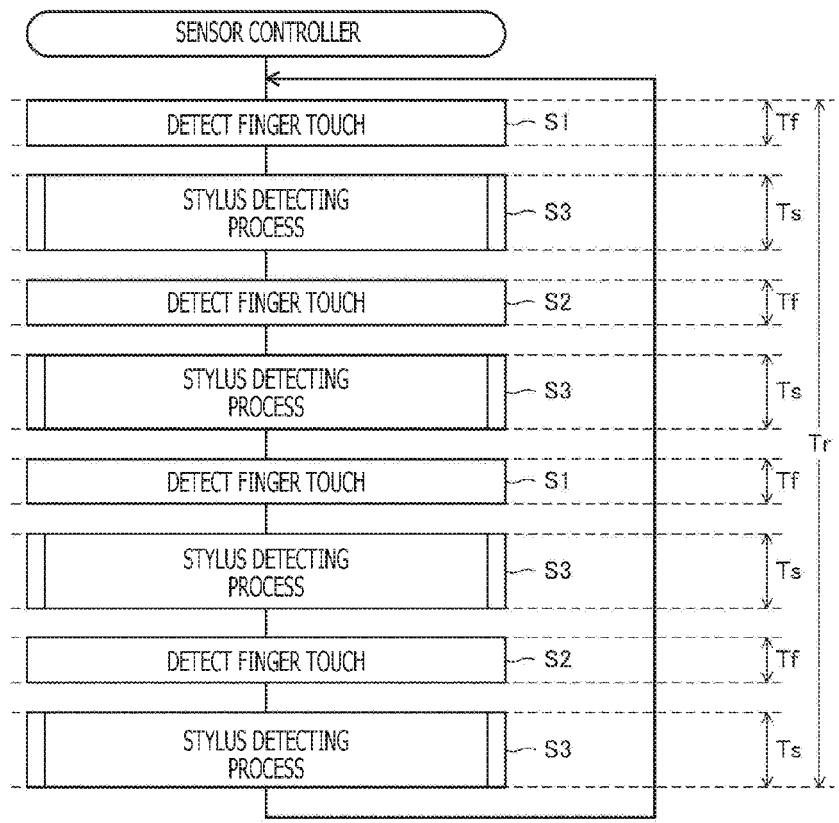
FIG. 9 is a flowchart of an overall operation sequence of the sensor controller 31 according to the embodiment of the present disclosure.

FIG. 9 is a flowchart of an overall operation sequence of the sensor controller 31. As depicted in FIG. 9, the sensor controller 31 is arranged to repeat the same operation that includes four finger touch detecting processes (steps S1 and S2) and four stylus detecting processes (step S3), in each time period Tr (e.g., 16.67 ms, which is the reciprocal of 60 Hz) that is defined as the reciprocal of a display refresh rate of a display panel such as a liquid crystal display panel or the like. The finger touch detecting processes and the stylus detecting processes are performed alternately. Each of the finger touch detecting processes is continuously carried out over a time period Tf (e.g., 1500 μs), and each of the stylus detecting processes is continuously carried out over a time period Ts (e.g., 2500 μs). For detecting finger F, two finger touch detecting processes (step S1 and step S2) that are performed discretely before and after a stylus detecting process are carried out as a single finger touch position detecting unit.

Figure 10:
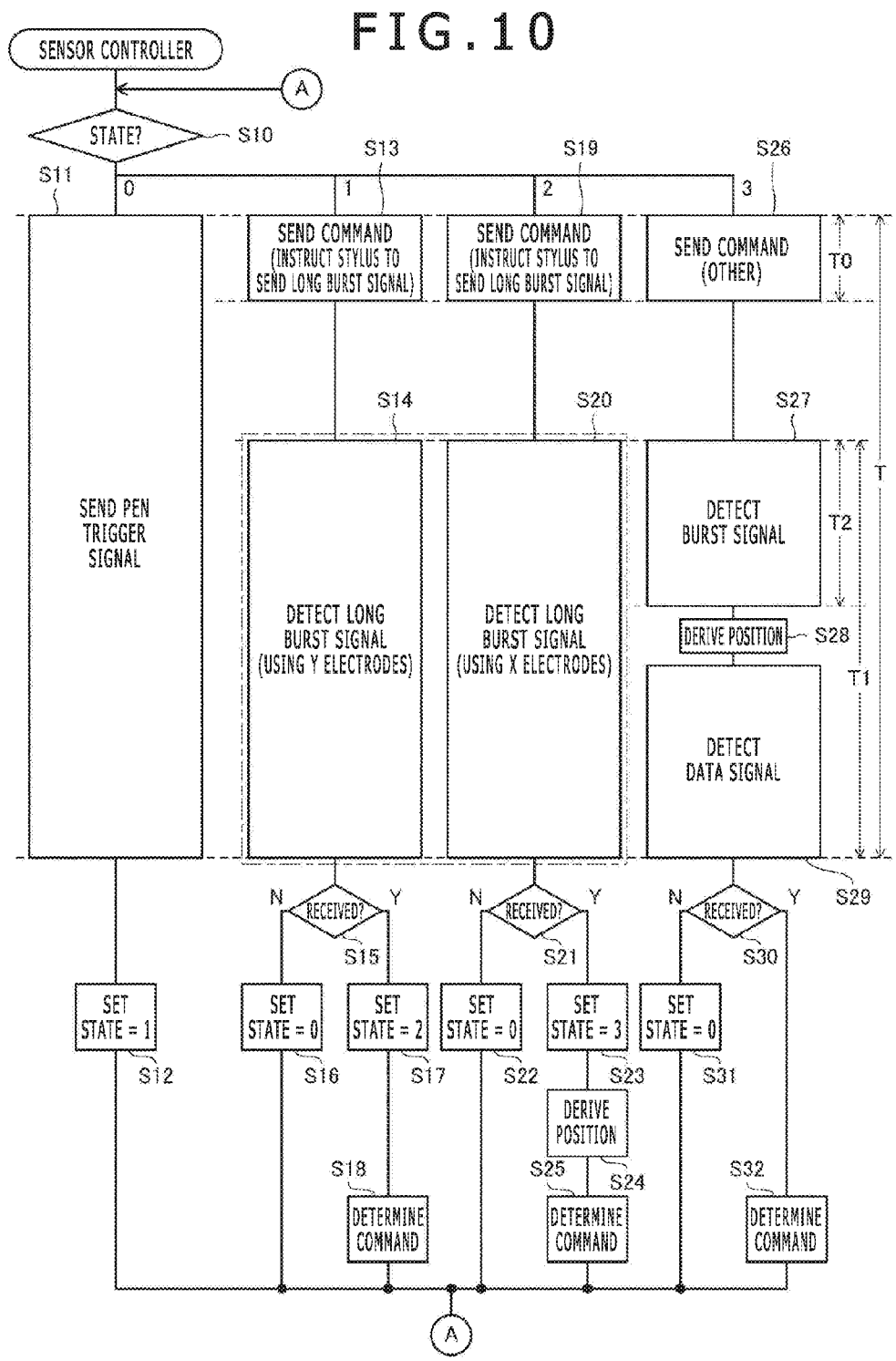
FIG. 10 is a flowchart of a stylus detecting process carried out by the sensor controller 31 according to the embodiment of the present disclosure.

FIG. 10 is a flowchart of a stylus detecting process carried out by the sensor controller 31. Although not depicted, the sensor controller 31 stores therein a state flag that indicates its own states. The states that can be indicated by the state flag include a stylus undetected and pen trigger signal transmission waiting state (=0), a stylus undetected and response to a pen trigger signal waiting state (=1), a stylus detected and position underived state (=2), a stylus position derived state (=3). The sensor controller 31 initially refers to the state flag (step S10).

If the state flag referred to in step S10 represents "0," then the sensor controller 31 sends a pen trigger signal over a predetermined time period T (e.g., 2500 μs which is the same as the time period Ts depicted in FIG. 9) in step S11. Specifically, the sensor controller 31 sends a repetition of a detection pattern c1 and a delimiter pattern STP. Having finished the continuous transmission of the pen trigger signal, the sensor controller 31 sets the state flag to "1" (step S12), after which control goes back to step S10.

If the state flag referred to in step S10 represents "1," then the sensor controller 31 sends a command signal for instructing the stylus 2 to send a long burst signal (first uplink signal) (step S13). The transmission of various command signals including this command signal takes at most a time period T0 (e.g., 200 μs) as depicted in FIG. 10. Thereafter, the sensor controller 31 performs a detecting operation to detect a long burst signal depicted in FIG. 10 over a time period T1 (step S14). This detecting operation is performed in the first half of the full-range scanning process (first scan) described with reference to FIG. 7(a).

When the time period T1 has elapsed and the detecting operation to detect a long burst signal is finished, the sensor controller 31 determines whether it has received a long burst signal or not (step S15). If the sensor controller 31 determines that it has not received a long burst signal as a result, then it sets the state flag to "0" (step S16), after which control goes back to step S10. Step S16 represents a process in which the sensor controller 31 fails to detect downlink signals for the reason that the stylus 2 is outside the sensing range SR depicted in FIG. 1, for example. If the sensor controller 31 determines that it has received a long burst signal in step S15, then it sets the state flag to "2" (step S17) and determines a command to be sent to the stylus (step S18), after which control goes back to step S10. The command that is determined here is a command that instructs the stylus 2 to send a long burst signal.

If the state flag referred to in step S10 represents "2," then the sensor controller 31 again sends a command signal (first uplink signal) that instructs the stylus 2 to send a long burst signal (requesting LB) (step S19). Thereafter, the sensor controller 31 again performs a detecting operation to receive a long burst signal over a time period T1 (step S20). This detecting operation is performed in the latter half of the full-range scanning process (first scan) described with reference to FIG. 7(b). When the operation of the first half of the full-range scanning process (step S14) and the operation of the latter half of the full-range scanning process (step S20) can be carried out in one time period T1, these two steps S14 and S20 may be performed in one process.

When the time period T1 has elapsed and the detecting operation to detect a long burst signal is finished, the sensor controller 31 determines whether it has received a long burst signal or not (step S21). If the sensor controller 31 determines that it has not received a long burst signal as a result, then it sets the state flag to "0" (step S22), after which control goes back to step S10. Step S22 represents a process in which the sensor controller 31 fails to detect downlink signals for the reason that the stylus 2 has left the sensing range SR depicted in FIG. 1, for example. If the sensor controller 31 determines that it has received a long burst signal in step S21, then it sets the state flag to "3" (step S23) and derives the position of the stylus 2 on the basis of the result of the detection of the long burst signal in step S14 and the result of the detection of the long burst signal in step S20 (step S24). The sensor controller 31 then determines a command to be sent to the stylus (step S25), after which control goes back to step S10. The command that is determined here is a command that instructs the stylus 2 to send various data (stylus ID, data representing a pen pressure, etc.). The command also serves to instruct the stylus 2 to send a burst signal over a time period T2.

If the state flag referred to in step S10 represents "3," then the sensor controller 31 sends a command signal (second uplink signal) representing a command determined in step S25 or step S32 to be described later (step S26). Thereafter, the sensor controller 31 successively performs a detecting operation to detect a burst signal over a time period T2 shorter than the time period T1 (step S27). If the sensor controller 31 detects a burst signal, then it derives positional coordinates of the stylus 2 on the basis of the detected intensities at the linear electrodes 30X, 30Y (step S28). The detecting operation to detect a burst signal in step S27 is performed according to the sector scanning process (second scan) described with reference to FIG. 7(*c*).

When the time period T2 has elapsed and the detecting operation to detect a long burst signal is finished, the sensor controller 31 performs a detecting operation to detect a data signal (step S29). This detecting operation includes a decoding process for decoding a data signal. The detecting operation to detect a data signal is carried out using one linear electrode 30X or linear electrode 30Y selected on the basis of the positional coordinates derived in preceding step S28. In this manner, it is possible to utilize the time period for detecting a data signal to the fullest, so that the sensor controller 31 can receive more data from the stylus 2.

Having finished the detecting operation to detect a data signal, the sensor controller 31 determines whether it has received a burst signal or a data signal or not (step S30). If the sensor controller 31 determines that it has not received either of them as a result, it sets the state flag to "0" (step S31), after which control returns to step S10. Step S31 represents a process in which the sensor controller 31 fails to detect downlink signals for the reason that the stylus 2 has left the sensing range SR depicted in FIG. 1, for example. If the sensor controller 31 determines that it has received either one of them in step S30, then the sensor controller 31 determines a command to be sent to the stylus 2 (step S32), and then lets control return to step S10. The command that is determined here is a command that instructs the stylus 2 to send various data (stylus ID, data representing a pen pressure, etc.). The command also serves to instruct the stylus 2 to send a burst signal over a time period T2.

Figure 11:
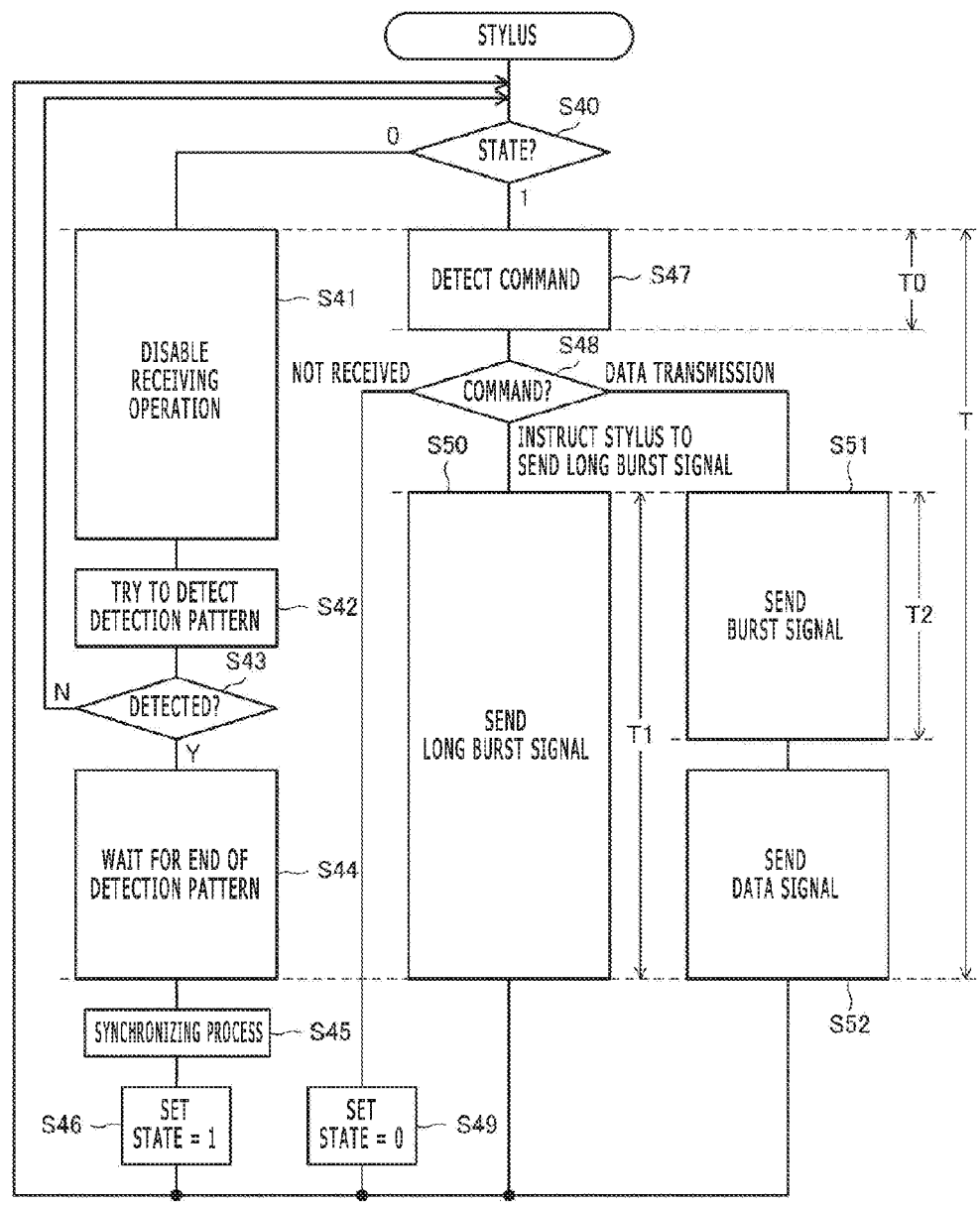
FIG. 11 is a flowchart of an operation sequence of the stylus 2 which corresponds to FIG. 10.

FIG. 11 is a flowchart of an operation sequence of the stylus 2 which corresponds to FIG. 10. Although not depicted, the stylus 2 also stores therein a state flag that indicates its own states. The states that can be indicated by the state flag include a sensor controller undetected state (=0) and a sensor controller detected state (=1). First, the stylus 2 refers to the state flag (step S40).

If the state flag referred to in step S40 represents "0," then the stylus 2 enters a reception operation disabled state (step S41). After a predetermined time period has elapsed, the stylus 2 tries to detect a detection pattern c1 described above (step S42). The disabled period is provided in step S41 in order to reduce the electric power consumed by the stylus 2 by intermittently performing the detecting operation to detect a detection pattern c1.

Then, the stylus 2 determines whether a detection pattern c1 has been detected by the detecting operation tried in step S42 (step S43). If the stylus 2 determines that a detection pattern c1 has not been detected as a result, then control goes back to step S40. If the stylus 2 determines that a detection pattern c1 has been detected, then the stylus 2 continues a detecting operation to detect symbols of a detection pattern c1 and a delimiter pattern STP until a delimiter pattern STP is detected (step S44). If a delimiter pattern STP is detected, then the stylus 2 performs a process of synchronizing with the sensor controller 31 on the basis of the detection time (step S45), and sets the state flag to "1" (step S46), after which control goes back to step S40. Specifically, the synchronizing process in step S45 is a process of generating a transmission and reception schedule with the controller 90 depicted in FIG. 8.

If the state flag referred to in step S40 represents "1," then the stylus 2 performs a detecting operation to detect a command signal (step S47). The detecting operation is carried out over a time period T0. Then, the stylus 2 determines whether a command signal has been detected by the detecting operation or not in step S47, and, if a command signal has been detected, identifies the content indicated by the command signal (step S48). If the controller 90 determines that a command signal has not been detected, then the stylus 2 sets the state flag to "0" (step S49), after which control goes back to step S40. Step S49 represents a process in which the stylus 2 fails to detect uplink signals for the reason that the stylus 2 has moved out of the sensing range SR depicted in FIG. 1, for example.

If the stylus 2 determines that a command signal has been detected which represents a command to send a long burst signal in step S48, then the stylus 2 determines to transmit a long burst signal and performs a process of sending a long burst signal over a time period T1 (step S50). Specifically, the stylus 2 continuously sends the signal having the predetermined waveform described above that makes up a long burst signal over a time period T1. Thereafter, control goes back to step S40.

If the stylus 2 determines that a command signal has been detected which represents a command to send data in step S48, then the stylus 2 determines to transmit a burst signal and performs a process of sending a burst signal over a time period T2 (step S51). Specifically, the stylus 2 continuously sends the signal having the predetermined waveform described above that makes up a burst signal over a time period T2. Then, the stylus 2 performs a process of sending a data signal including the instructed data (step S52). Thereafter, control goes back to step S40.

According to the present embodiment, as described above, in a stylus undetected state where the possibility that the stylus 2 is hovering is high, the sensor controller 31 can expect the stylus 2 to send a long burst signal which continues for a longer period of time than a normal burst signal. Consequently, while the time period of the detecting operation per linear electrode is made longer than when a normal burst signal is received, it is possible to scan more linear electrodes (in the present embodiment, all the linear electrodes 30Y or the linear electrodes 30X) within the time period of continuous transmission of a long burst signal, for the purpose of detecting a burst signal. The possibility that the sensor controller 31 may fail to detect a burst signal can be reduced while ensuring that the sensor controller 31 is capable of detecting a burst signal over a wide range in the touch surface.

According to the present disclosure, furthermore, since the full-range scanning process is used for receiving a long burst signal, the time period of the detecting operation per linear electrode is further increased while ensuring that the sensor controller 31 is capable of detecting a burst signal over the entire the touch surface.

According to the present disclosure, moreover, since the sensor controller 31 instructs the stylus 2 to send a long burst signal based on a command signal that instructs the stylus 2 to send a long burst signal, the stylus 2 is clearly aware of a timing to send a long burst signal.

Although the preferred embodiment of the present disclosure has been described above, the present disclosure is not limited to the embodiment at all, but can be reduced to practice in various forms without departing from the scope thereof.

First through sixth modifications of the above embodiment will be described below.

Figure 12:
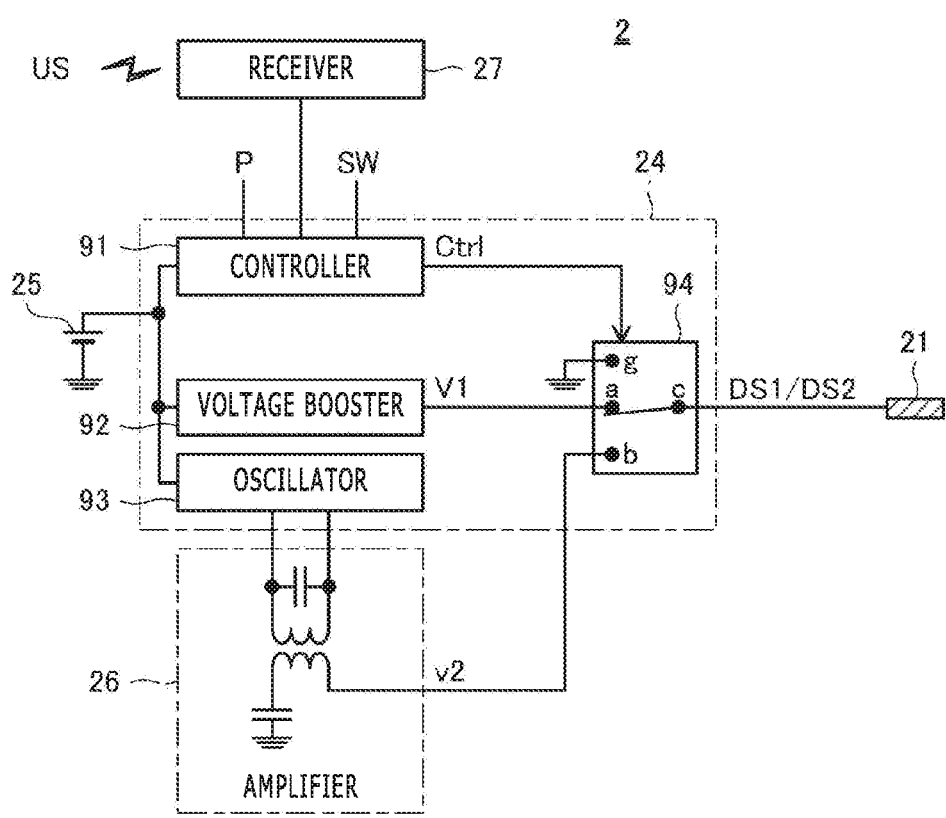
FIG. 12 is a diagram depicting an arrangement of a stylus 2 according to a first modification of the embodiment of the present disclosure.

FIG. 12 is a diagram depicting an arrangement of a stylus 2 according to a first modification of the above embodiment. A sensor controller 31 and the stylus 2 according to the present modification are different from those of the above embodiment in that they use, for transmission of uplink signals, wireless communication protocols not based on the capacitive coupling principle. The stylus 2 is different from that of the above embodiment in that it supports the transmission of two kinds of downlink signals DS1 and DS2 whose carrier signals are of different types from each other. Both the downlink signals DS1 and DS2 are capable of sending a long burst signal, a burst signal, and data signal as described above. The stylus 2 selectively uses the downlink signals DS1 and DS2 depending on the kind of the sensor controller 31 which is in close proximity thereto. The arrangement of the stylus 2 according to the present modification will be described in detail below with reference to FIG. 12.

As depicted in FIG. 12, the stylus 2 according to the present modification has an electrode 21, a signal processor 24, a power supply 25, an amplifier 26, and a receiver 27.

The receiver 27 is a functional section capable of performing communication based on Bluetooth® (registered trademark) as wireless communication. According to the present modification, the receiver 27 receives an uplink signal that the sensor controller 31 has sent based on Bluetooth® (registered trademark).

The signal processor 24 is a functional section having a function to selectively send the two kinds of downlink signals DS1, DS2 and a function to receive an uplink signal US via the receiver 27. Specifically, the signal processor 24 has a controller 91, a voltage booster 92, an oscillator 93, and a switch 94.

The voltage booster 92 has a function to boost a DC voltage supplied from the power supply 25, generating a DC voltage V1. According to a specific example, the voltage booster 92 includes a DC-DC converter or a charge pump circuit.

The oscillator 93 has a function to perform an oscillating operation based on the DC voltage supplied from the power supply 25 to generate an unmodulated sine-wave signal (carrier signal) that oscillates at a predetermined frequency. The amplifier 26 has a function to amplify the sine-wave signal generated by the oscillator 93 with a predetermined amplification factor, generating an unmodulated sine-wave signal v2. As depicted in FIG. 12, the amplifier 26 should preferably include am amplifying circuit made up of a transformer and capacitors.

The switch 94, which includes a one-circuit three-contact switch element, has a terminal "a" connected to the output terminal of the voltage booster 92, a terminal "b" connected to the output terminal of the amplifier 26, a terminal "g" connected to a power supply line that is supplied with a ground potential, and a common terminal c connected to the electrode 21.

The controller 91 is an integrated circuit (IC) for supplying a control signal Ctrl that controls the switch 94 and controlling the receiver 27 to receive an uplink signal sent by the sensor controller 31. The controller 91 operates with electric power supplied from the power supply 25. According to a specific example, the controller 91 may be an application specific integrated circuit (ASIC) or an MCU. The controller 91 determines which one of the downlink signal DS1 and the downlink signal DS2 is used to send a long burst signal, a burst signal, and a data signal on the basis of the content of an uplink signal received via the receiver 27 or the fact that no uplink signal is received (in the case where the sensor controller 31 supports only unidirectional communication from the stylus 2 to the sensor controller 31). As with the controller 90 depicted in FIG. 8, the controller 91 also determines a transmission and reception schedule for various signals, etc., and controls the switch 94 based on the determined transmission and reception schedule.

For sending the downlink signal DS1, the controller 91 controls the switch 94 to function as a first switch provided between the output terminal of the voltage booster 92 and the electrode 21. Specifically, the controller 91 controls the switch 94 to switch between a state in which the terminal "a" is connected to the common terminal "c" and a state in which the terminal "g" is connected to the common terminal "c." The state in which the terminal "a" is connected to the common terminal "c" corresponds to a state in which the first switch is on, and the state in which the terminal "g" is connected to the common terminal "c" corresponds to a state in which the first switch is off.

For sending a burst signal or a long burst signal using the downlink signal DS1, the controller 91 controls the switch 94 to perform switching operations periodically in predetermined periodic cycles. When the terminal "a" is connected to the common terminal "c," the DC voltage V1 comes through as the output voltage of the switch 94. When the terminal "g" is connected to the common terminal "c," the ground potential comes through as the output voltage of the switch 94. Consequently, the switch 94 outputs an unmodulated pulse train signal that serves as a long burst signal or a burst signal.

For sending a data signal using the downlink signal DS1, the controller 91 controls the switch 94 to perform a switching operation depending on data, such as a pen pressure level P or switch information SW indicating whether a side switch (not depicted) on the stylus 2 is on or off. The data may include other information such as a stylus ID (identifying information of the stylus 2), etc. The controller 91 generates a data signal which is a pulse train signal modulated with data, by controlling the switch 94 to perform switching operations in this manner. Specific methods of modulating a pulse train signal by the controller 91 may include on-off modulation and frequency modulation.

For sending the downlink signal DS2, the controller 91 controls the switch 94 to function as a second switch provided between the output terminal of the amplifier 26 and the electrode 21. Specifically, the controller 91 controls the switch 94 to switch between a state in which the terminal "b" is connected to the common terminal "c" and a state in which the terminal "g" is connected to the common terminal "c." The state in which the terminal "b" is connected to the common terminal "c" corresponds to a state in which the second switch is on, and the state in which the terminal "g" is connected to the common terminal "c" corresponds to a state in which the second switch is off.

For sending a burst signal or a long burst signal using the downlink signal DS2, the controller 91 controls the switch 94 to connect the common terminal "c" securely to the terminal "b." Therefore, the switch 94 outputs the unmodulated sine-wave signal v2 that serves as a long burst signal or a burst signal.

For sending a data signal using the downlink signal DS2, the controller 91 controls the switch 94 to perform a switching operation depending on data, such as pen pressure data P or switch information SW. It should be noted that, also in this case, the data may include other information such as a stylus ID. The controller 91 generates a data signal which is a pulse train signal modulated with data, by thus controlling the switch 94 to perform switching operations in this manner. A specific method of modulating a sine-wave signal by the controller 91 may include on-off modulation.

According to the present modification, as described above, Bluetooth® (registered trademark) can be used to send and receive an uplink signal. Although the example using Bluetooth® (registered trademark) has been described above, proximity wireless communications other than Bluetooth® (registered trademark) may be used to send and receive an uplink signal.

According to the present modification, the stylus 2 is capable of performing bidirectional or unidirectional communication between itself and a plurality of different types of sensor controllers 31 by selectively using the downlink signals DS1 and DS2.

Figure 13:
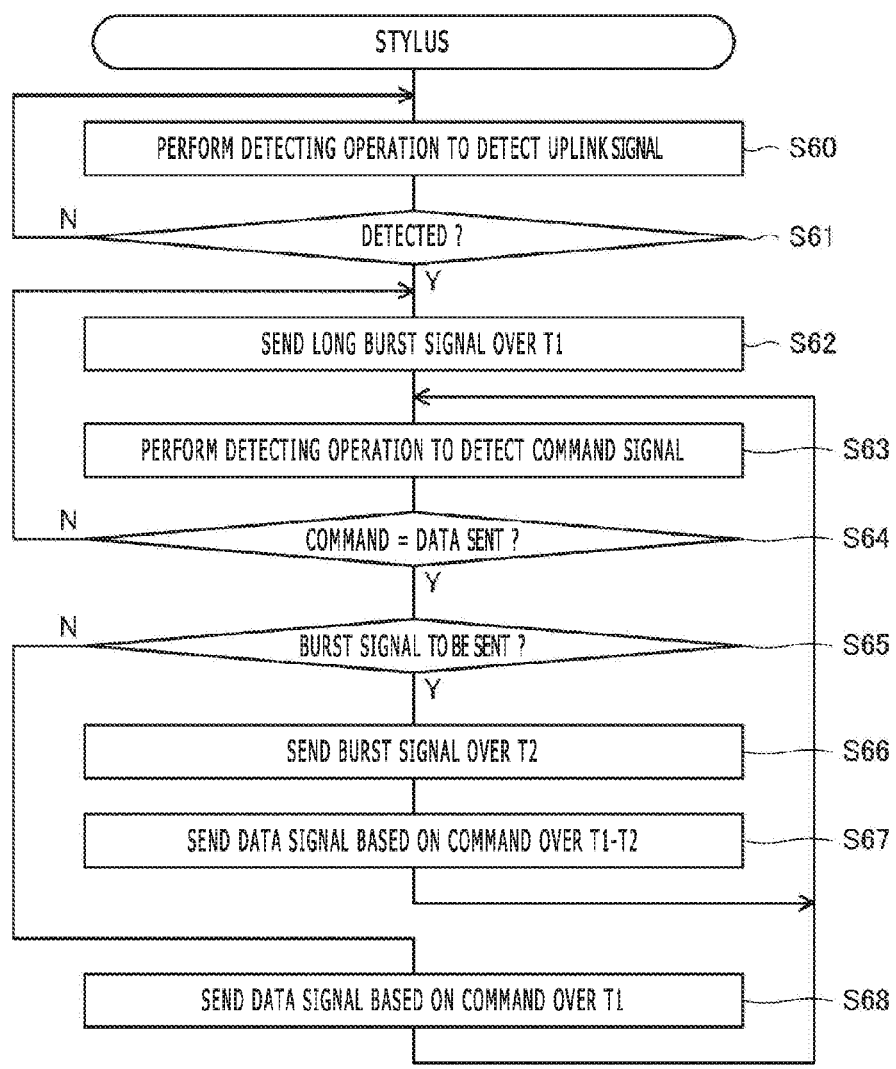
FIG. 13 is a flowchart of an operation sequence of a stylus 2 according to a second modification of the embodiment of the present disclosure.

FIG. 13 is a flowchart of an operation sequence of a stylus 2 according to a second modification of the above embodiment. The stylus 2 according to the present modification is different from the stylus 2 according to the above embodiment in that the stylus 2 according to the present modification sends a long burst signal immediately after it receives any uplink signal while it is not detecting the sensor controller 31, and in that it determines whether to send a burst signal immediately prior to a data signal. Details of operation of the stylus 2 according to the present modification will be described below with reference to FIG. 13.

As depicted in FIG. 13, the stylus 2 according to the present modification initially performs a detecting operation to detect an uplink signal (step S60). The stylus 2 determines whether an uplink signal has been detected by the detecting operation or not (step S61). If the stylus 2 determines that an uplink signal has not been detected, then control goes back to step S60 to repeat the detecting operation. If the stylus 2 determines that an uplink signal has been detected, then the stylus 2 sends a long burst signal without waiting for a command signal (step S62). Specifically, the stylus 2 sends signal having the predetermined waveform described above over a time period T1.

After having sent the long burst signal, the stylus 2 carries out a detecting operation to detect a command signal (step S63). Then, the stylus 2 determines whether a command signal that instructs the stylus 2 to send a data signal has been detected or not (step S64). If the stylus 2 determines that the command signal has not been detected, then control goes back to step S62 to repeat the transmission of a long burst signal. If the stylus 2 determines that the command signal has been detected, then the stylus 2 determines whether it is to send a burst signal or not (step S65). The stylus 2 should preferably make this determination based on the content of the detected command signal. In this manner, it is possible for the sensor controller 31 to control the stylus 2 to send a burst signal or not.

A process to be carried out if the stylus 2 determines that it is to send a burst signal in step S65 is the same as steps S51 and S52 depicted in FIG. 11. Specifically, the stylus 2 sends a burst signal by sending the signal having the predetermined waveform over a time period T2 (step S66), and sends a data signal including data instructed by the command signal detected in step S63 over a subsequent time period T1-T2 (step S67). If the stylus 2 determines that it is not to send a burst signal in step S65, then the stylus 2 sends a data signal including data instructed by the command signal detected in step S63 over a time period T1 (step S68).

After having sent the data signal in step S67 or step S68, the stylus 2 lets control return to step S63. The stylus 2 is thus continuously able to send data as instructed by the sensor controller 31.

According to the present modification, as described above, the stylus 2 can send a long burst signal without waiting for a command signal including a command that instructs the stylus 2 to send a long burst signal. Therefore, the stylus 2 can send a long burst signal to a sensor controller 31 that does not particularly support long burst signals.

Since the stylus 2 determines whether a burst signal is to be sent immediately prior to a data signal, if the sensor controller 31 does not require the stylus 2 to send a burst signal, the stylus 2 can send a data signal over a longer time period (i.e., can send more data), and the sensor controller 31 can acquire more data.

Figure 14:
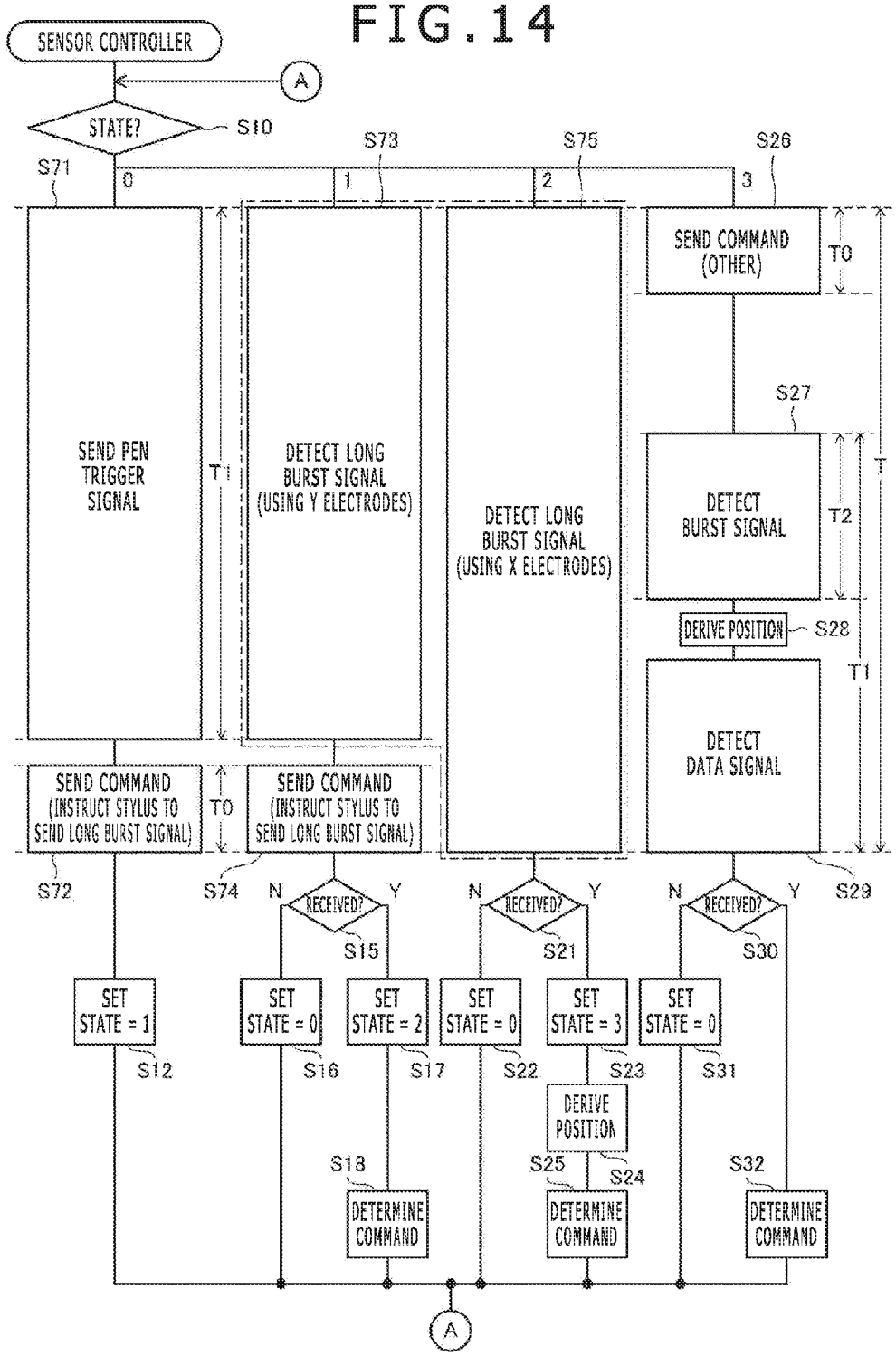
FIG. 14 is a flowchart of an operation sequence of a sensor controller 31 according to a third modification of the embodiment of the present disclosure.

FIG. 14 is a flowchart of an operation sequence of a sensor controller 31 according to a third modification of the above embodiment. The sensor controller 31 according to the present modification is different from the stylus 2 according to the above embodiment in that the sensor controller 31 sends a pen trigger signal in the first stylus detecting process (step S3 in FIG. 9) or sends a command signal for instructing the stylus 2 to send a long burst signal subsequently to the execution of the first half of the full-range scanning process. Details of operation of the sensor controller 31 according to the present modification will be described below with reference to FIG. 14.

As depicted in FIG. 14, if the state flag referred to in step S10 represents "0," then the sensor controller 31 according to the present modification sends a pen trigger signal over a time period shorter than the example depicted in FIG. 10 (specifically, a time period T1) (step S71). Then, the sensor controller 31 sends a command signal (first uplink signal) for instructing the stylus 2 to send a long burst signal (step S72). Then, the sensor controller 31 sets the state flag to "1" (step S12), after which control goes back to step S10.

If the state flag referred to in step S10 represents "1," then the sensor controller 31 according to the present modification performs a detecting operation to detect a long burst signal over a time period T1 (step S73), and thereafter again sends a command signal (first uplink signal) for instructing the stylus 2 to send a long burst signal (step S74). The operation sequence is the same as step S14 depicted in FIG. 10 in that the detecting operation in step S73 is carried out in the first half of the full-range scanning process, but comparison between the operation sequence and the example depicted in FIG. 10 indicates that the detecting operation to detect a long burst signal and the transmission of a command signal are in reverse order.

If the state flag referred to in step S10 represents "2," then the sensor controller 31 according to the present modification performs a detecting operation to detect a long burst signal over a time period T (step S75). The operation sequence is the same as step S14 depicted in FIG. 10 in that the detecting operation in step S73 is carried out in the latter half of the full-range scanning process, but it will be understood from comparison between FIGS. 10 and 14 that the entire time period T can be used for the detecting operation to detect a long burst signal. The subsequent process is the same as the example depicted in FIG. 10, and its detailed description will be omitted.

In the present modification, the command sent in steps S72 and S74 for instructing the stylus 2 to send a long burst signal should preferably include information representing a time period of continuous transmission of a long burst signal. The stylus 2 should preferably control its time period of continuous transmission of a long burst signal depending on the time period of continuous transmission represented by the information. In this fashion, it is possible to equalize the period of time during which the sensor controller 31 performs the detecting operation to detect a long burst signal and the period of time during which the stylus 2 sends a long burst signal.

According to the present modification, as described above, the latter half of the full-range scanning process can be carried out over a longer time period compared with the above embodiment. Therefore, the reception time per linear electrode 30X can further be increased, allowing the sensor controller 31 to receive a burst signal further reliably compared with the above embodiment.

FIG. 15 is a diagram depicting a long burst signal sent by a stylus 2 according to a fourth modification of the above embodiment. A sensor controller 31 and a stylus 2 according to the present modification are different from those of the above embodiment with respect to the format of a long burst signal. The format of a long burst signal according to the present modification will be described in detail below with reference to FIG. 15.

As depicted in FIG. 15, the long burst signal according to the present modification has a pattern in which a signal having a frequency f1 (first frequency) and a signal having a frequency f2 (second frequency) different from the frequency f1 are successively arranged. Specifically, the long burst signal includes a first part having the frequency f1 and a latter part having the frequency f2.

If the long burst signal has a single frequency throughout its entire interval, then the sensor controller 31 is unable to obtain any information from the received long burst signal. As a consequence, there is a possibility that the sensor controller 31 will mistake mere white noise or frequency-selective noise having a strong component near the frequency f1 of a long burst signal. According to the long burst signal in the present modification, however, the sensor controller 31 is able to determine that the received signal is a long burst signal due to the fact that the two kinds of frequencies are detected in a known sequence. According to the present modification, therefore, the possibility that the sensor controller 31 will operate by mistaking a signal which is not a long burst signal for a long burst signal can be lowered.

According to the present embodiment, the full-range scanning process for detecting a long burst signal is carried out such that the odd-numbered linear electrodes 30Y are scanned first and the even-numbered linear electrodes 30Y are scanned subsequently. The full-range scanning process is carried out in this way in order for the sensor controller 31 to be able to receive both the first and second half portions of a long burst signal. If the time period T1 of a long burst signal is sufficiently long, then the sensor controller 31 may successively scan all the linear electrodes 30Y at the frequency f1 and then successively scan again all the linear electrodes 30Y at the frequency f2.

According to the present modification, as described above, the possibility that the sensor controller 31 will operate by mistaking a signal which is not a long burst signal for a long burst signal can be lowered.

In the present modification, the example has been described in which a long burst signal is configured such that its first and second half portions have different frequencies. However, a long burst signal may have any features insofar as they allow the sensor controller 31 to distinguish between white noise and a long burst signal. For example, a long burst signal may be a signal in which L frequencies are varied in a given sequence that has been determined in advance with respect to the sensor controller 31. In this case, the sensor controller 31 may scan N linear electrodes 30Y (or the M linear electrodes 30X) repeatedly L times while varying the frequencies.

FIG. 16 is a flowchart of an operation sequence of a stylus 2 according to a fifth modification of the above embodiment. A sensor controller 31 and a stylus 2 according to the present modification are different from those of the above embodiment in that the stylus 2 determines that the sensor controller 31 has not yet detected the stylus 2 on the basis of an uplink signal. Details of operation of the stylus 2 according to the present modification will be described below with reference to FIG. 16.

As depicted in FIG. 16, the stylus 2 according to the present modification initially enters a sleep state (step S80). The sleep state is the same as the reception operation disabled state (step S41) depicted in FIG. 11.

After a predetermined time period has elapsed in the sleep state, the stylus 2 performs a detecting operation to detect an uplink signal (step S81). The stylus 2 determines whether an uplink signal has been detected in the detecting operation or not (step S82). If the stylus 2 determines that an uplink signal has not been detected, then control goes back to step S80 in which the stylus 2 enters a sleep state again. If the stylus 2 determines that an uplink signal has been detected, then the stylus 2 determines whether the uplink signal indicates that the sensor controller 31 has not yet detected the stylus 2 (it is in an undetected state) (step S83). In the stylus 2 depicted in FIG. 8, the controller 90 carries out this determining process. In the stylus 2 depicted in FIG. 12, the controller 91 carries out this determining process.

Specific processes of the determination in step S83 include the following processes, for example. The first process applies in a situation where the sensor controller 31 explicitly sends an uplink signal indicating that it has not detected the stylus 2. In this case, the stylus 2 may carry out the determination in step S83 on the basis of whether it has received the uplink signal. The second process applies in a situation where, as described in the above embodiment, the sensor controller 31 sends a command signal for instructing the stylus 2 to send a long burst signal. As described above with reference to FIG. 10, the sensor controller 31 sends a command signal for instructing the stylus 2 to send a long burst signal when the sensor controller 31 has not yet detected by the stylus 2. In this case, therefore, the stylus 2 may carry out the determination in step S83 on the basis of whether it has received a command signal for instructing the stylus 2 to send a long burst signal or not.

If the result of the determination is affirmative in step S83, then the stylus 2 sends a long burst signal (step S84). Specifically, the stylus 2 sends the signal having the predetermined waveform described above over a time period T1. The long burst signal that is sent may be the long burst signal depicted in FIG. 15 (a signal having a feature capable of distinguishing between white noise and a long burst signal).

If the result of the determination is negative in step S83, then the stylus 2 determines whether it is to send a burst signal or not (step S85). A subsequent process (steps S85 through S88) is the same as the process of steps S65 through S68 illustrated in FIG. 13, and will not be described in detail below.

According to the present modification, as described above, the stylus 2 determines whether the sensor controller 31 has detected the stylus 2 or not, and is able to determine that it is to send a long burst signal, a burst signal, and a data signal (or it is to send only a data signal) on the basis of the result of the determination.

Figure 18:
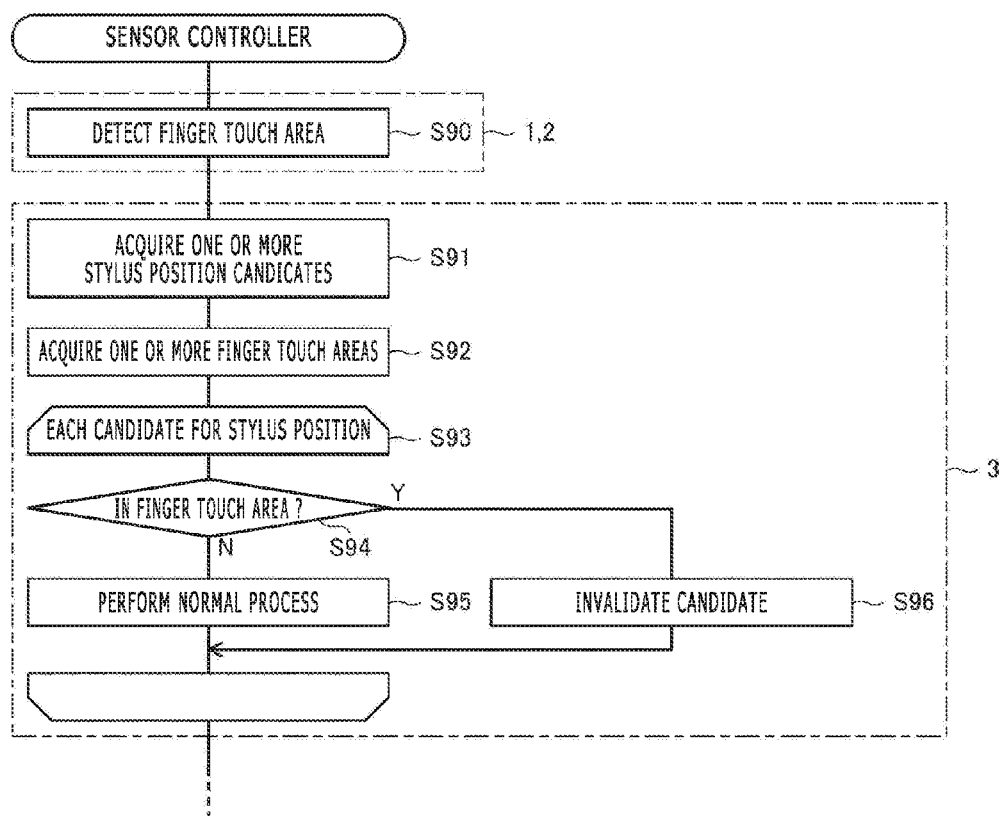
FIG. 18 is a flowchart of an operation sequence of a sensor controller 31 according to the sixth modification of the embodiment of the present disclosure.

FIG. 17 is a diagram illustrative of a specific position excluding process according to a sixth modification of the above embodiment. FIG. 18 is a flowchart of an operation sequence of a sensor controller 31 according to the sixth modification of the present embodiment. The present modification serves to remove those of one or more positions of the stylus 2 that have been derived as the result of the stylus detecting process (step S3 in FIG. 9) which are positioned in finger touch areas (information representing areas touched by finger F depicted in FIG. 1) detected by the finger touch detecting process (steps S1 and S2 in FIG. 9). The present modification will be described in detail below.

FIG. 17(a) depicts finger touch areas A1 and A2 detected by the finger touch detecting process and FIG. 17(b) depicts positions B1 through B3 of the stylus 2 derived by the stylus detecting process carried out immediately after the finger touch detecting process in FIG. 17(a).

The finger touch areas A1 and A2 in FIG. 17(a) are detected because part of the electric current that flows through the linear electrodes of the sensor 30 flows toward the human body via a capacitive coupling between finger F and the linear electrodes 30X and 30Y, as described above. In FIG. 17(a), the area of the finger touch area A1 is much larger than the area of the finger touch area A2. The finger touch area A1 having such a large area is normally formed when the palm or first of a hand, rather than a finger, is held in contact with the touch surface. Normally, the finger touch area A1 is invalidated by another process (palm rejection process) based on the size of the area. FIG. 17(a) depicts a state before A1 is invalidated.

The positions B1 through B3 of the stylus 2 depicted in FIG. 17(b) are derived on the basis of the detected intensities of a burst signal at the linear electrodes 30X and 30Y in step S20 depicted in FIG. 10, for example. A burst signal that reaches the sensor 30 (see FIG. 2) includes a component that comes directly from the electrode 21 (see FIGS. 8 and 12) of the stylus 2 and, in addition, components that come via the hand the carries the stylus 2 and the other hand. Of the three positions B1 through B3 detected in FIG. 17(b), only the position B3 has been derived from the component that has come directly from the electrode 21 of the stylus 2 to the sensor 30, and the other two positions have been derived from the components that have come to the sensor 30 via the hand the carries the stylus 2 and the other hand.

Referring back to FIG. 17(a), it will be understood that the finger touch areas A1 and A2 are detected at substantially the same positions as the positions B1 and B2. The reason for this is that the positions B1 and B2 are detected because a hand is close to the touch surface and the hand can be detected by the finger touch detecting process. The sensor controller 31 according to the present modification uses such a relationship between the finger touch areas and the stylus positions. The positions B1 and B2 are removed (excluded) from the positions B1 through B3 of the stylus 2 that have been derived by the stylus detecting process by referring to the result of the finger touch detecting process. Details of operation of the sensor controller 31 for excluding those positions will be described below with reference to FIG. 18.

As depicted in FIG. 18, the sensor controller 31 initially detects finger touch areas (step S90). This detection process is performed in the finger touch detecting process (steps S1 and S2) depicted in FIG. 9.

Thereafter, control goes to the stylus detecting process (step S3) depicted in FIG. 9, in which the sensor controller 31 acquires one or more position candidates for the stylus 2 in the process indicated by step S20 depicted in FIG. 10 (step S91). The sensor controller 31 then acquires one or more finger touch areas detected in step S90 (step S92). Providing the above palm rejection process is carried out, the finger touch areas that are thus acquired have yet to undergo the palm rejection process.

Then, the sensor controller 31 repeats the process subsequent to step S94 on each of the position candidates for the stylus 2 that have been acquired in step S91. Specifically, the sensor controller 31 determines whether the position represented by each position candidate is included in either one of the one or more finger touch areas acquired in step S92 (step S94). If the sensor controller 31 determines that the position is not included, then the sensor controller 31 recognizes the position represented by the position candidate as the position of the stylus 2, and performs a normal process (step S95). If the sensor controller 31 determines that the position is included, then the sensor controller 31 invalidates the position candidate (step S96). The invalidated position candidate will not be used as at least the position of the stylus 2 in a subsequent process. The invalidating process may be realized by not outputting the position of the stylus 2 from the sensor controller 31 to the system controller of the electronic device 3 or by outputting the position of the stylus 2 and using a flag or the like to indicate that the position is an invalid area.

According to the present modification, as described above, the sensor controller 31 can remove a position derived from a component of a burst signal that has come to the sensor 30 via a hand carrying the stylus 2 or the other hand, from a plurality of positions of the stylus 2 derived by the stylus detecting process.

In the above embodiment, the full-range scanning process has been described as being carried out using all of the N linear electrodes 30Y and the M linear electrodes 30X. In the full-range scanning process, it is sufficient to perform a larger scan (a scan using many linear electrodes) than the sector scan, and it is not necessary to use all of the N linear electrodes 30Y and the M linear electrodes 30X. In other words, the full-range scanning process may be performed using a detection area in a first range which covers the touch surface wholly or partly, and the sector scan may be performed using a detection area in a range selected within the first range. In this case, a command signal (a command signal for instructing the stylus 2 to send a long burst signal) prior to the full-range scanning process may be sent from the first range, and a command signal (a command signal for instructing the stylus 2 to send a burst signal and a data signal) prior to the sector scan may be sent from the selected range.

In the above embodiment, the scanning process that successively uses the N linear electrodes 30Y (first half) and the scanning process that successively uses the M linear electrodes 30X (latter half) are separately described as representing operation of the full-range scanning process. If the time period T1 of continuous transmission of a long burst signal is sufficiently long, then the position (two-dimensional coordinate position) of the stylus 2 may be specified using the linear electrodes 30X after operating the linear electrodes 30Y.

In the above embodiment, the example has been described in which a data signal is not sent after a long burst signal has been sent. However, a data signal may be sent subsequently to a long burst signal. The time period of continuous transmission of a data signal in this case may be shorter than the time period of continuous transmission of a burst signal and a data signal depicted in FIG. 3. This data signal is suitable for the transmission of data that can be represented by a shorter number of bits than a pen pressure or the like, such as an on/off state of a switch mounted on a casing of the stylus 2.

DESCRIPTION OF REFERENCE SYMBOLS

2: Stylus
3: Electronic device
21: Electrode
23: Pen pressure detection sensor
24: Signal processor
25: Power supply
26: Amplifier
27: Receiver
30: Sensor
30X, 30Y: Linear electrode
31: Sensor controller
40: Selector
41$x$, 41$y$: Conductor selecting circuit
50: Receiver
51: Amplifying circuit
52: Detecting circuit
53: Converter
60: Transmitter
61: Pattern supply
62: Switch
63: Spreading processor
64: Code train holder
65: Transmission guard
70: Logic unit
71$a$: Waveform regenerator
71$b$: Correlation operator
73: Modulator
74: Voltage boosting circuit
75: Transmitter
76: Switch
90: Controller
91: Controller
92: Voltage booster
93: Oscillator
94: Switch A1, A2: Finger touch area
B1-B3: Stylus position
DS1, DS2: Downlink signal
EN: Trigger signal
F: Finger
P: Pen pressure data
Res: Data
SR: Sensing range
SW: Switch information
US: Uplink signal

The invention claimed is:

1. A stylus capable of bidirectionally communicating with a sensor controller, comprising:
   a receiver that receives an uplink signal sent by the sensor controller;
   a controller, which,
      in response to a data of the uplink signal indicating a request for a data signal, determines to send a normal burst signal, which has a predetermined pattern that is known in advance between the stylus and the sensor controller, over a second time period T2; and
      in response to a data of the uplink signal indicating a request for a long burst signal having the predetermined pattern and used to identify a position of the stylus, determines to send the long burst signal over a first time period T1 longer than the second time period T2; and
   a transmitter that sends the normal burst signal or the long burst signal on the basis of a result of the determination to send the normal burst signal or the long burst signal, respectively, by the controller.

2. The stylus according to claim 1, wherein when the controller determines to send the normal burst signal, the transmitter transmits the data signal in a time period corresponding to a difference between the second time period T2 and the first time period T1.

3. The stylus according to claim 1, wherein
   the data of the uplink signal varies depending on whether the sensor controller has detected or not detected a presence or position of the stylus, and
   when the data of the uplink signal indicates that the sensor controller has not detected the presence or position of the stylus, the controller determines to send the long burst signal.

4. The stylus according to claim 1, wherein the controller determines whether to send the normal burst signal or the long burst signal, irrespective of a state of the stylus being either a hover state or a contact state.

5. The stylus according to claim 1, wherein the normal burst signal and the long burst signal having the predetermined pattern have a predetermined frequency.

6. A stylus capable of bidirectionally communicating with a sensor controller, comprising:
   a receiver that receives an uplink signal sent by the sensor controller;
   a controller that determines a state of the sensor controller based on the uplink signal; and
   a transmitter, which,
      in response to the controller determining, based on the uplink signal, that the sensor controller has not detected the stylus, continuously sends a long burst signal used to identify a position of the stylus and having a predetermined pattern that is known in advance between the stylus and the sensor controller over a predetermined time period, and
      in response to the controller determining, based on the uplink signal, that the sensor controller has derived a position of the stylus, sends a data signal indicative of an operation state of the stylus, rather than continuously sending the long burst signal having the predetermined pattern over the predetermined time period.

7. The stylus according to claim 6, wherein the predetermined pattern is a pattern including a series of a signal having a first frequency and a signal having a second frequency different from the first frequency.

8. The stylus according to claim 6, wherein, in response to the controller determining, based on the uplink signal, that the sensor controller has derived the position of the stylus, the transmitter continuously sends a signal having the predetermined pattern over a time period shorter than the predetermined time period and sends the data signal.

9. The stylus according to claim 6, wherein the operation state of the stylus is a pen pressure level sensed by a pressure sensor.

10. The stylus according to claim 6, wherein the transmitter determines whether to send the long burst signal or the data signal, irrespective of a state of the stylus being either a hover state or a contact state.

11. The stylus according to claim 6, wherein the long burst signal having the predetermined pattern has a predetermined frequency.

* * * * *